(12) United States Patent
Kato

(10) Patent No.: US 11,007,821 B2
(45) Date of Patent: May 18, 2021

(54) PNEUMATIC TIRE

(71) Applicant: The Yokohama Rubber Co., LTD., Tokyo (JP)

(72) Inventor: Yoshitaka Kato, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/499,804

(22) PCT Filed: Jan. 25, 2018

(86) PCT No.: PCT/JP2018/002290
§ 371 (c)(1),
(2) Date: Sep. 30, 2019

(87) PCT Pub. No.: WO2018/179755
PCT Pub. Date: Oct. 4, 2018

(65) Prior Publication Data
US 2020/0055347 A1    Feb. 20, 2020

(30) Foreign Application Priority Data

Mar. 30, 2017  (JP) .............................. JP2017-068467
Mar. 30, 2017  (JP) .............................. JP2017-068469

(51) Int. Cl.
*B60C 11/11*      (2006.01)
*B60C 11/13*      (2006.01)
(Continued)

(52) U.S. Cl.
CPC ......... *B60C 11/0311* (2013.01); *B60C 11/033* (2013.01); *B60C 11/0316* (2013.01);
(Continued)

(58) Field of Classification Search
CPC ............. B60C 11/0311; B60C 11/0316; B60C 11/033; B60C 11/125; B60C 11/1369;
(Continued)

(56) References Cited

U.S. PATENT DOCUMENTS

D158,031 S  *  4/1950  Wilcox ........................ D12/544
5,180,453 A      1/1993  Fukasawa et al.
(Continued)

FOREIGN PATENT DOCUMENTS

CN    202826989 U  *  3/2013
GB    1549347 A    *  8/1979
(Continued)

OTHER PUBLICATIONS

Machine translation for WO 2014/170283 (Year: 2020).*
(Continued)

*Primary Examiner* — Steven D Maki
(74) *Attorney, Agent, or Firm* — Thorpe North & Western

(57) ABSTRACT

A pneumatic tire includes a tread; sidewalls; and beads. Lug grooves are formed in the tread inclining symmetrically about an equator, an inclination angle α of the lug grooves relative to the lateral direction being 15°≤α≤45°. A width W1 of the lug grooves at the tread edge and an interval W2 between the lug grooves at the tread edge satisfying 0.7≤W1/W2≤1.5. Shoulder grooves connecting lug grooves are inclined in an opposite direction to the lug grooves have an inclination angle β relative to the lug grooves being 80°≤β≤100°, a center position of the shoulder grooves being 15% to 35% of tread width TW from the equator. An area A1 of the shoulder grooves and an area A2 of shoulder blocks satisfy 0.2≤A1/A2≤0.6. A groove area ratio of the tread is 0.4 to 0.7.

20 Claims, 13 Drawing Sheets

(51) Int. Cl.
*B60C 11/03* (2006.01)
*B60C 11/04* (2006.01)
*B60C 11/12* (2006.01)

(52) U.S. Cl.
CPC ............ *B60C 11/04* (2013.01); *B60C 11/125* (2013.01); *B60C 11/1369* (2013.01); *B60C 11/1384* (2013.01); *B60C 2011/039* (2013.01); *B60C 2011/0313* (2013.01); *B60C 2200/065* (2013.01)

(58) Field of Classification Search
CPC ......... B60C 11/1384; B60C 2011/0313; B60C 2011/0365; B60C 2011/0367; B60C 2011/0372
See application file for complete search history.

(56) References Cited

U.S. PATENT DOCUMENTS

| | | | | |
|---|---|---|---|---|
| D390,818 | S | * | 2/1998 | De Barsy .................... D12/566 |
| D397,066 | S | * | 8/1998 | Grosskopf ................... D12/566 |
| D786,782 | S | * | 5/2017 | Dixon .......................... D12/563 |
| 2005/0133141 | A1 | | 6/2005 | Neubauer et al. |
| 2010/0032067 | A1 | | 2/2010 | Neubauer et al. |
| 2013/0263988 | A1 | * | 10/2013 | Minoli .................... B60C 11/13 152/209.19 |
| 2014/0116590 | A1 | | 5/2014 | Dixon et al. |

FOREIGN PATENT DOCUMENTS

| | | | |
|---|---|---|---|
| JP | H03-014703 | | 1/1991 |
| JP | 2001-063319 | | 3/2001 |
| JP | 2003-205706 | | 7/2003 |
| JP | 2005-067419 A | * | 3/2005 |
| JP | 2005-178768 | | 7/2005 |
| JP | 2010-042806 | | 2/2010 |
| JP | 2013-159321 | | 8/2013 |
| JP | 2014-084109 | | 5/2014 |
| JP | 2014-234091 | | 12/2014 |
| JP | 2016-215661 | | 12/2016 |
| WO | WO-2014/170283 A1 | * | 10/2014 |

OTHER PUBLICATIONS

Machine translation for China 202826989 (Year: 2020).*
Machine translation for Japan 2005-067419 (Year: 2020).*
International Search Report for International Application No. PCT/JP2018/002290 dated Mar. 27, 2018, 4 pages, Japan.

* cited by examiner

PNEUMATIC TIRE

TECHNICAL FIELD

The present technology relates to a pneumatic tire suitable for a construction vehicle, in particular a scraper vehicle, and particularly relates to a pneumatic tire capable of providing traction performance and uneven wear resistance in a compatible manner to a high degree.

BACKGROUND ART

For pneumatic tires used on construction vehicles typified by scraper vehicles, traction performance is important. Thus, a tread pattern typically employed includes a tread portion provided with a plurality of lug main grooves that extend in the tire lateral direction and open on both sides of a tire equator to a tread edge (for example, see Japan Unexamined Patent Publication No. 2016-215661).

In particular, to ensure traction performance, a directional tread pattern is effective (for example, see Japan Unexamined Patent Publication Nos. 2001-63319, 2013-159321, 2014-234091). However, in pneumatic tires for construction vehicles such as those described above, with a directional tread pattern, when uneven wear is present, rotation changes the rotation direction causing a large decrease in traction performance. Thus, this kind of pneumatic tire cannot provide traction performance and uneven wear resistance in a compatible manner.

SUMMARY

The present technology provides a pneumatic tire capable of providing traction performance and uneven wear resistance in a compatible manner to a high degree.

A pneumatic tire of an embodiment of the present technology comprises:

an annular tread portion extending in a tire circumferential direction;

a pair of sidewall portions disposed on either side of the tread portion; and a pair of bead portions disposed inward of the sidewall portions in a tire radial direction;

lug main grooves extending in a tire lateral direction and opening to a tread edge being formed on either side of a tire equator in the tread portion, the lug main grooves being inclined with respect to the tire lateral direction in a symmetrical manner about the tire equator, an inclination angle $\alpha$ of the lug main grooves with respect to the tire lateral direction at a position 25% of a tread width from the tire equator being set to a range $15° \leq \alpha \leq 45°$, and a width W1 of the lug main grooves at the tread edge and an interval W2 between the lug main grooves at the tread edge satisfying a relationship $0.7 \leq W1/W2 \leq 1.5$;

shoulder inclined grooves connecting lug main grooves adjacent in the tire circumferential direction being formed in the tread portion, the shoulder inclined grooves each being inclined in an opposite direction to a corresponding lug main groove of the lug main grooves, an inclination angle $\beta$ of the shoulder inclined grooves with respect to the lug main grooves being set in a range $80° \leq \beta \leq 100°$, a center position of the shoulder inclined grooves being set in a range from 15% to 35% of the tread width from the tire equator, and an area A1 of the shoulder inclined grooves and an area A2 of shoulder blocks defined outside the shoulder inclined grooves satisfying a relationship $0.2 \leq A1/A2 \leq 0.6$; and a groove area ratio of the tread portion being from 0.4 to 0.7.

In the present technology, by the lug main grooves that extending in the tire lateral direction and open to the tread edge and the shoulder inclined grooves that connect the lug main grooves adjacent in the tire circumferential direction being formed in the tread portion and by specifying the inclination angle $\alpha$ of the lug main grooves, the ratio W1/W2 of the width W1 of the lug main grooves at the tread edge and the interval W2 between lug main grooves at the tread edge, the inclination angle $\beta$ of the shoulder inclined grooves, the center position of the shoulder inclined grooves, the ratio A1/A2 of the area A1 of the shoulder inclined grooves and the area A2 of the shoulder blocks, and the groove area ratio of the tread portion, uneven wear can be effectively suppressed and traction performance can be exhibited at the maximum. As a result, traction performance and uneven wear resistance can be provided in a compatible manner to a higher degree than conventional technologies.

In the present technology, preferably, positions of the lug main grooves are offset in the tire circumferential direction on either side of the tire equator; and an offset amount S of the lug main grooves and a pitch P of the lug main grooves in the tire circumferential direction satisfy a relationship $0.3 \leq S/P \leq 0.5$. By offsetting the positions of the lug main grooves in the tire circumferential direction on either side of the tire equator, a momentary increase in ground contact pressure and sudden deformation of the block end portions when the tire rotates can be suppressed, and uneven wear can be effectively suppressed.

Preferably, a groove depth D1 of the shoulder inclined grooves at a central position in a longitudinal direction and a groove depth D2 of the lug main grooves at a position 25% of the tread width from the tire equator satisfy a relationship $0.3 \leq D1/D2 \leq 0.7$. By the shoulder inclined grooves being shallower than the lug main grooves, the traction performance at least until the intermediate stages of wear is sufficiently ensured, block rigidity near the shoulder inclined grooves can be increased, and uneven wear resistance can be favorably ensured.

Preferably, center inclined grooves connecting the lug main grooves located on either side of the tire equator are formed in the tread portion; and a width W3 of the center inclined grooves at a central position in a longitudinal direction and the width W1 of the lug main grooves at the tread edge satisfy a relationship $0.3 \leq W3/W1 \leq 0.8$. By providing the center inclined grooves that extend across the tire equator and connect the lug main grooves in the center region of the tread portion where the ground contact pressure is high, the traction performance can be effectively enhanced. In the center region of the tread portion, the ground contact pressure is high and block deformation is great. However, by the center inclined grooves being narrow, traction performance can be enhanced without impairing uneven wear resistance.

Preferably, a groove depth D3 of the center inclined grooves at a central position in a longitudinal direction and a groove depth D2 of the lug main grooves at a position 25% of the tread width from the tire equator satisfy a relationship $0.3 \leq D3/D2 \leq 0.7$. By the center inclined grooves being shallower than the lug main grooves, the traction performance at least until the intermediate stages of wear is sufficiently ensured, block rigidity near the center inclined grooves can be increased, and uneven wear resistance can be favorably ensured.

Preferably, each of the lug main grooves communicate with another two of the lug main grooves via two of the center inclined grooves;

an inclination angle γ of the center inclined grooves with respect to the tire lateral direction is set to a range $10° \leq \gamma \leq 40°$;

center blocks located further inward in the tire lateral direction than the shoulder inclined grooves are defined in the tread portion;

each of the center blocks comprise a chamfered portion at a corner portion sandwiched by two of the center inclined grooves; and a distance X1 in the tire lateral direction from a ridge line on a road contact surface of the chamfered portion to an end of the corner portion and a groove depth D2 of the lug main grooves at a position 25% of the tread width from the tire equator satisfy a relationship $0.3 \leq X1/D2$. By forming the chamfered portion at the corner portion sandwiched by the two center inclined grooves having the inclination angle γ in each of the center blocks and by sufficiently ensuring the distance X1 in the tire lateral direction between the ridge line on the road contact surface of the chamfered portion and the end of the corner portion, the traction performance and uneven wear resistance can be further improved.

Preferably, at least a portion of the ridge line on the road contact surface of the chamfered portion is located on a side of the tire equator where the end of the corner portion is located; and a maximum separation amount X2 of the ridge line from the tire equator and the groove depth D2 of the lug main grooves at a position 25% of the tread width from the tire equator satisfy a relationship $0 \leq X2/D2 \leq 1.0$. By at least a portion of the ridge line on the road contact surface of the chamfered portion being located on the side of the tire equator where the end of the corner portion is located, the center blocks on either side of the tire equator overlap in the tire lateral direction. Thus, uneven wear of the center blocks can be suppressed without impairing traction performance.

Preferably, both end points of the ridge line on the road contact surface of the chamfered portion are located on the side of the tire equator where the end of the corner portion is located; and a separation amount X3 from the tire equator at one of the end points and a separation amount X4 from the tire equator at the other end point satisfy the relationship $0 \leq X4/X3 \leq 1.0$. In this case, the center block is formed with an appropriate obtuse angle at both end points of the ridge line on the road contact surface of the chamfered portion. This allows the uneven wear of the center blocks to be effectively suppressed.

Alternatively, preferably only one end point of two end points of the ridge line on the road contact surface of the chamfered portion is located on the side of the tire equator where the end of the corner portion is located; and a separation amount X3 from the tire equator at one of the end points and a separation amount X4 from the tire equator at the other end point satisfy the relationship $-1.0 \leq X4/X3 \leq 0$. Here, when one end point is located on side of the tire equator where the end of the corner portion is located, the separation amount X3 is a positive value. However, when the other end point is located on the side of the tire equator opposite to where the end of the corner portion is located, the separation amount X4 is a negative value. In an example in which the relationship is specified as such, the ridge line of the chamfered portion is increased in length, thus enhancing traction performance. Also, the overlapping of the center blocks on either side of the tire equator in the tire lateral direction can be maintained.

Preferably, the ridge line on the road contact surface of the chamfered portion is a curve, projecting toward the end of the corner portion; and a protruding amount X5 of the curve and the groove depth D2 of the lug main grooves at a position 25% of the tread width from the tire equator satisfy a relationship $0.05 \leq X5/D2 \leq 1.0$. This allows the uneven wear of the center blocks to be effectively suppressed.

Preferably, a groove depth D4 of the chamfered portion and the groove depth D2 of the lug main grooves at a position 25% of the tread width from the tire equator satisfy a relationship $0.3 \leq D4/D2 \leq 0.7$. By the chamfered portion being shallower than the lug main grooves, the uneven wear resistance can be favorably ensured without impairing the rigidity of the center blocks at least until the intermediate stages of wear.

Preferably, a narrow groove that opens at both ends to the lug main grooves is formed at a bottom portion of each of the center inclined grooves; and a width W4 of the narrow groove and the width W3 of the center inclined grooves at the central position in the longitudinal direction satisfy a relationship $0.05 \leq W4/W3 \leq 0.5$. By providing the narrow groove in the bottom portion of the center inclined groove, the groove area from the intermediate stages of wear onward is ensured and traction performance can be favorably maintained.

Preferably, a groove depth D5 of the narrow groove with the road contact surface of the tread portion as a reference and the groove depth D2 of the lug main grooves at a position 25% of the tread width from the tire equator satisfy a relationship $0.5 \leq D5/D2 \leq 1.0$. By specifying the groove depth D5 of the narrow groove in this manner, the groove area from the intermediate stages of wear onward is ensured and traction performance can be favorably maintained.

In the present technology, "tread width" refers to the ground contact width in the tire axial direction as measured when the tire is mounted on a regular rim and inflated to a regular internal pressure, and placed vertically upon a flat surface with a regular load applied thereto. "Tread edge" refers to the edge portion (ground contact edge) in the tire axial direction of the ground contact region specified by the ground contact width. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire & Rim Association, Inc.), and refers to a "measuring rim" in the case of ETRTO (The European Tyre and Rim Technical Organisation). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO.

In the present technology, each dimension is measured with the tire mounted on a regular rim and inflated to the regular internal pressure.

Additionally, "groove area ratio of the tread portion" is the ratio of the groove area in the ground contact region to the area of the ground contact region of the tread portion.

DETAILED DESCRIPTION

Figure 1:
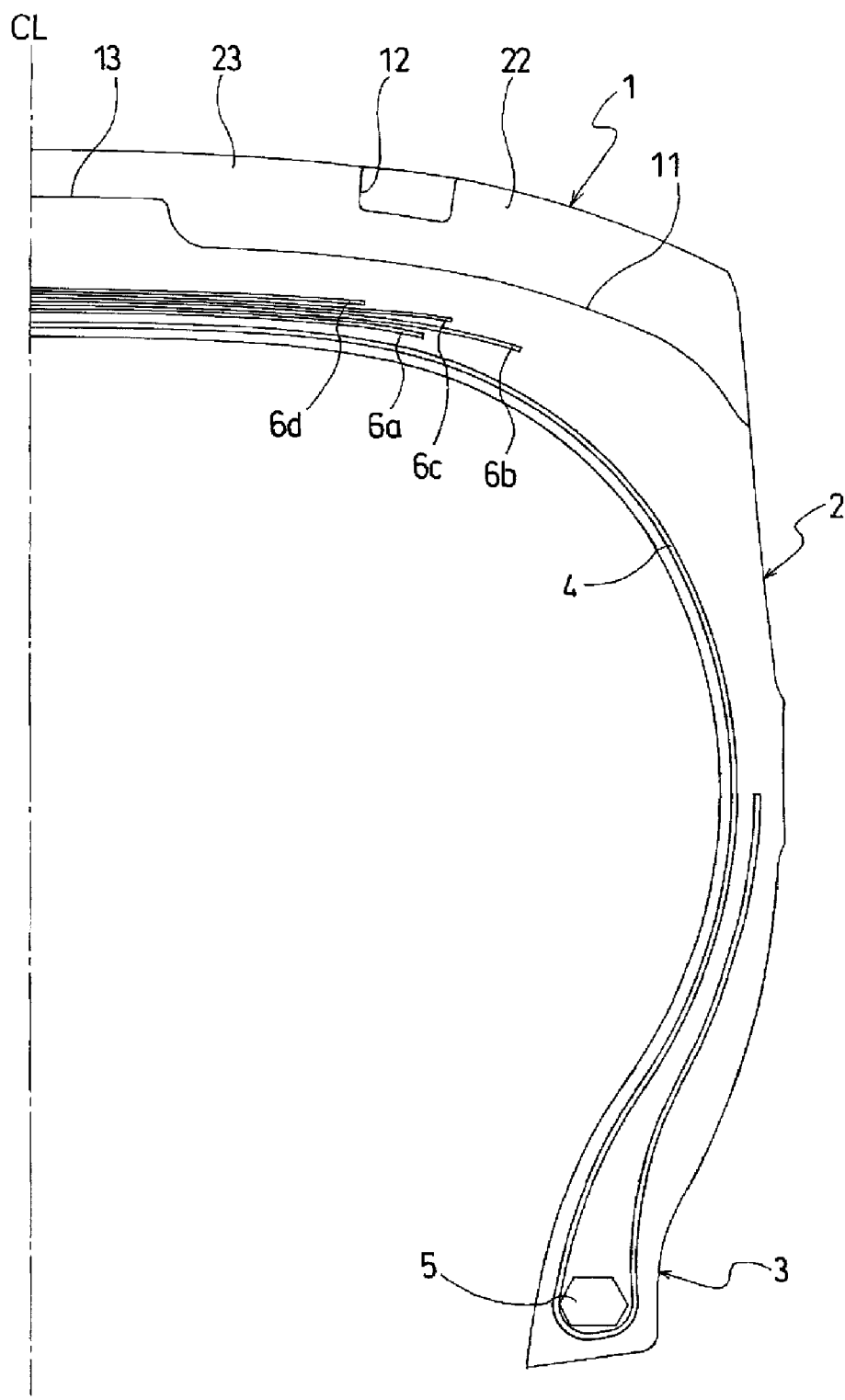
FIG. 1 is a meridian cross-sectional view illustrating a pneumatic tire according to an embodiment of the present technology.
Figure 2:
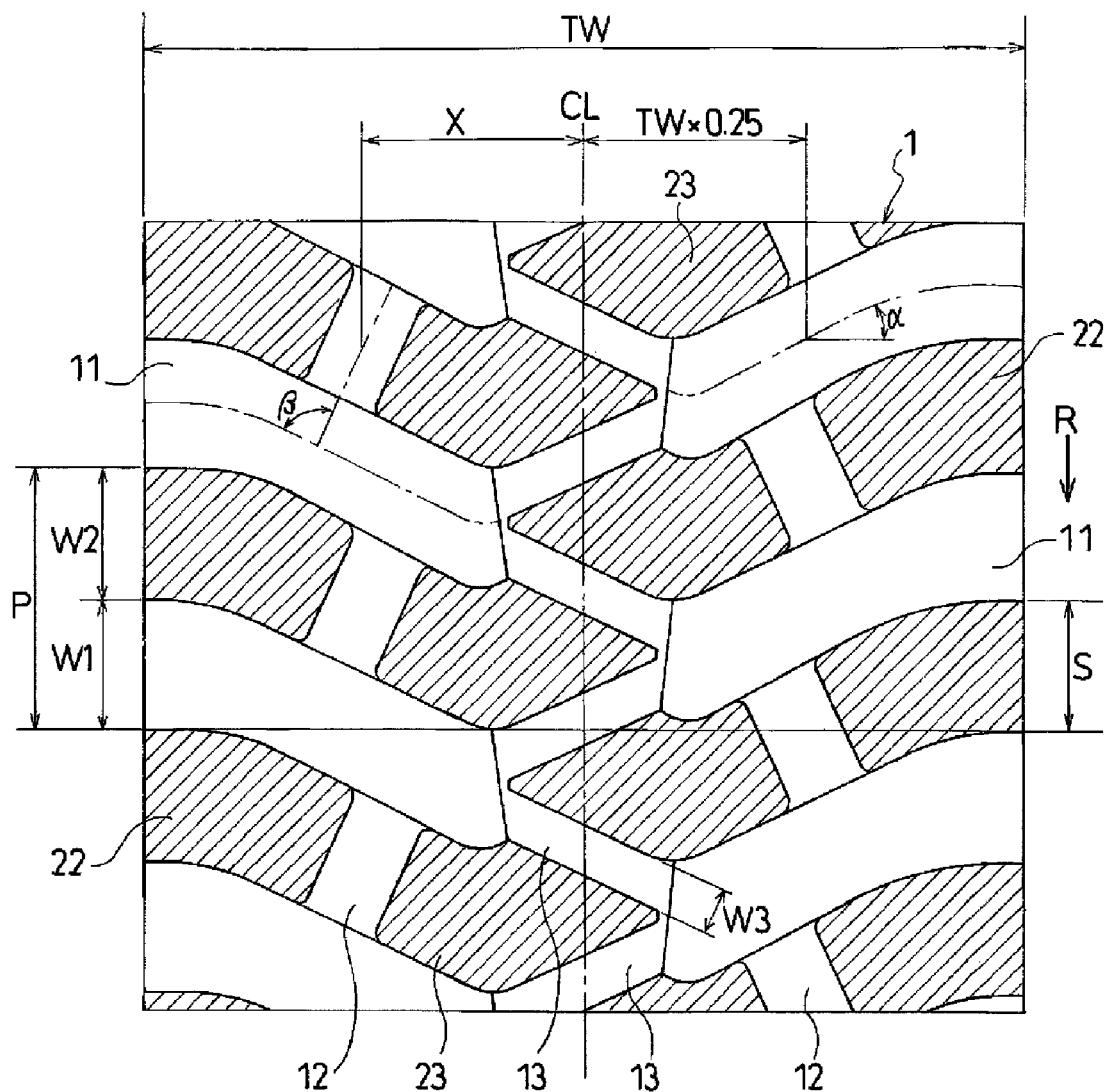
FIG. 2 is a plan view illustrating a tread pattern of a pneumatic tire according to an embodiment of the present technology.
Figure 3:
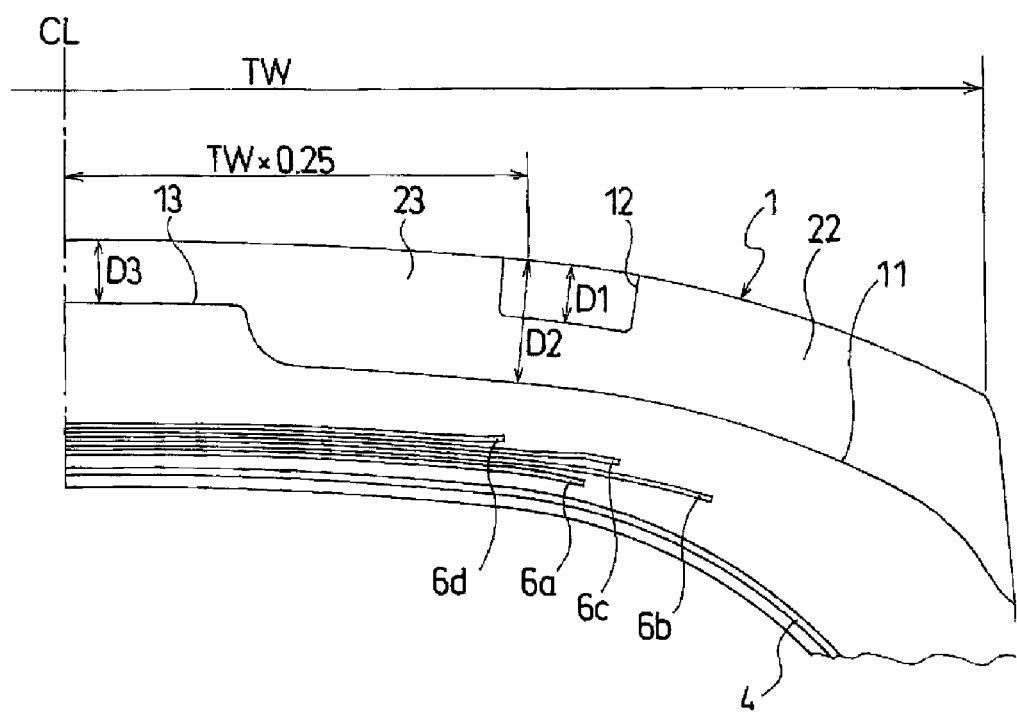
FIG. 3 is a cross-sectional view illustrating a tread portion of a pneumatic tire according to an embodiment of the present technology.

Configurations of embodiments of the present technology are described in detail below with reference to the accompanying drawings. FIGS. 1 to 3 illustrate a pneumatic tire for a scraper vehicle according to an embodiment of the present technology. In FIG. 1, only the structure on one side of a tire equator CL in the tire lateral direction is illustrated, but the pneumatic tire is provided with a symmetrical structure on the other side of the pneumatic tire. In FIG. 2, in order to facilitate understanding of the tread structure, a portion that comes into contact with the road surface when the tire is running is depicted as a hatched portion.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction. The tread portion 1 includes a square shoulder, and a shoulder edge thereof is a ground contact edge.

At least one carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. Preferably, steel cords are used as the reinforcing cords of the carcass layer 4 but organic fiber cords such as polyester fiber cords and the like can also be used.

A plurality of belt layers 6a, 6b, 6c, 6d are embedded on the outer circumferential side of the carcass layer 4 in the tread portion 1. The belt layers 6a to 6d each include a plurality of reinforcing cords that are inclined with respect to the tire circumferential direction, with the reinforcing cords of the discretionary different layers arranged in a criss-cross manner. In the belt layers 6a to 6d, the inclination angle of the reinforcing cords with respect to the tire circumferential direction ranges from, for example, 10° to 40°. Steel cords are preferably used as the reinforcing cords of the belt layers 6a to 6d.

Note that the tire internal structure described above represents a typical example for a pneumatic tire, and the pneumatic tire is not limited thereto.

As illustrated in FIG. 2, a plurality of lug main grooves 11 positioned on each side of the tire equator CL that extend in the tire lateral direction are formed in a tread portion 1 at intervals in a tire circumferential direction. The lug main grooves 11 each include an inner end portion in the tire lateral direction that terminates at a position separated from the tire equator CL and an outer end portion in the tire lateral direction that opens to the tread edge. The lug main grooves 11 on each side of the tire equator CL are inclined symmetrically with respect to the tire lateral direction. In other words, the lug main grooves 11 each incline in one direction in the tire circumferential direction (the opposite direction to a rotation direction R) outward in the tire lateral direction. An inclination angle α of the lug main grooves 11 with respect to the tire lateral direction at a position 25% of a tread width TW from the tire equator CL is set in the range $15° \leq \alpha \leq 45°$. The inclination angle α is the inclination angle of the center line of the lug main groove 11. In addition, a width W1 of the lug main groove 11 at the tread edge and an interval W2 between lug main grooves 11 at the tread edge satisfy the relationship $0.7 \leq W1/W2 \leq 1.5$.

A plurality of shoulder inclined grooves 12 that connect the lug main grooves 11, 11 adjacent in the tire circumferential direction are formed in the tread portion 1. The shoulder inclined grooves 12 are inclined in the opposite direction to the corresponding lug main grooves 11. In other words, the shoulder inclined grooves 12 are inclined in the opposite direction to the lug main grooves 11 they connect to. At the connecting portion of the shoulder inclined groove 12 and the lug main groove 11, an inclination angle β of the shoulder inclined groove 12 with respect to the lug main groove 11 is set in the range $80° \leq \beta \leq 100°$. The inclination angle β is the inclination angle of the center line of the shoulder inclined groove 12. Additionally, a distance X from the tire equator CL to a center position of the shoulder inclined groove 12 in the longitudinal direction and the width direction is set in a range from 15% to 35% of the tread width TW. As a result, a plurality of shoulder blocks 22 are defined by the lug main grooves 11 and the shoulder inclined grooves 12 in the shoulder regions of the tread portion 1. An area A1 (area in a plan view) of each of the shoulder inclined grooves 12 and an area A2 (area in a plan view) of each shoulder block 22 defined outside the shoulder inclined grooves 12 satisfy the relationship $0.2 \leq A1/A2 \leq 0.6$.

Furthermore, a plurality of center inclined grooves 13 that connect the lug main grooves 11 on either side of the tire equator CL are formed in the tread portion 1. The inclination directions of the center inclined grooves 13 with respect to the tire lateral direction are alternately inverted in the tire circumferential direction. Also, two center inclined grooves 13, 13 are connected to the inner end portion in the tire lateral direction of one lug main groove 11 and branched off, communicating with different lug main grooves 11 located on the opposite side of the tire equator CL. As a result, a plurality of center blocks 23 are defined by the lug main grooves 11, the shoulder inclined grooves 12, and the center inclined grooves 13 in the center region of the tread portion 1.

The pneumatic tire described above includes the lug main grooves 11, the shoulder inclined grooves 12, and the center inclined grooves 13 in the tread portion 1. As a result, the groove area ratio of the tread portion 1 is set in a range from 0.4 to 0.7. In other words, the ratio of the groove area (area of the region other than the hatched portion) to the area of the ground contact region having the tread width TW is set to be in the range described above.

In the pneumatic tire described above, by the lug main grooves 11 that extend in the tire lateral direction and open to the tread edge and the shoulder inclined grooves 12 that connect the lug main grooves 11 adjacent in the tire circumferential direction being formed in the tread portion 1 and by specifying the inclination angle α of the lug main grooves 11, the ratio W1/W2 of the width W1 of the lug main grooves 11 at the tread edge and the interval W2 between lug main grooves 11 at the tread edge, the inclination angle β of the shoulder inclined grooves 12, the center position of the shoulder inclined grooves 12, the ratio A1/A2 of the area A1 of the shoulder inclined grooves 12 and the area A2 of the shoulder blocks, and the groove area ratio of the tread portion 1, uneven wear can be effectively suppressed and traction performance can be exhibited at the maximum.

More specifically, the lug main grooves 11 are disposed so as to be inclined in a symmetrical manner about the tire equator CL, and the inclination angle α of the lug main grooves 11 with respect to the tire lateral direction is within the range $15° \le \alpha \le 45°$ at a position 25% of the tread width TW from the tire equator CL, and more preferably in the range $25° \le \alpha \le 35°$. This allows the grit in the lug main grooves 11 to be effectively discharged from the center region of the tread portion 1 outward in the tire lateral direction and good traction performance to be exhibited. When the inclination angle α of the lug main grooves 11 is too small, grit easily clogs the lug main grooves 11. When the inclination angle α is too large, traction performance is reduced.

In addition, the width W1 of the lug main groove 11 at the tread edge and the interval W2 between lug main grooves 11 at the tread edge may satisfy the relationship $0.7 \le W1/W2 \le 1.5$, and more preferably may satisfy $0.9 \le W1/W2 \le 1.2$ to provide traction performance and uneven wear resistance in a compatible manner. By the width W1 of the lug main grooves 11 at the tread edge being relatively large, the amount of grit that can enter the lug main grooves 11 is increased, contributing to an enhancement in traction performance. However, if this is too large, the width of the blocks (shoulder blocks 22 and center blocks 23) defined by the lug main grooves 11 becomes narrower and the rigidity is reduced. As a result, uneven wear is more likely to occur.

Also, by additionally providing the shoulder inclined grooves 12 that connect the lug main grooves 11, 11 adjacent in the tire circumferential direction in the tread portion 1, the width of the blocks defined by the lug main grooves 11 and the groove area can be ensured. Furthermore, the inclination angle β of the shoulder inclined grooves 12 with respect to the lug main grooves 11 is set to be substantially a right angle in the range $80° \le \beta \le 100°$. This allows sharpening of the blocks defined by the lug main grooves 11 to be avoided, and uneven wear to be suppressed. Here, when the inclination angle β of the shoulder inclined grooves 12 deviates from the range described above, uneven wear is more likely to occur due to the acute angle of the blocks.

Additionally, a distance X from the tire equator CL to a center position of the shoulder inclined groove 12 is set in a range from 15% to 35% of the tread width TW. Thus, the rigidity of the blocks defined by the lug main grooves 11 can be ensured and uneven wear can be suppressed. In other words, when the distance X from the tire equator CL to the center position of the shoulder inclined groove 12 deviates from the range described above, the shoulder block 22 or the center block 23 becomes smaller, making uneven wear more likely to occur.

The area A1 (area in a plan view) of each of the shoulder inclined grooves 12 and an area A2 (area in a plan view) of each shoulder block 22 may satisfy the relationship $0.2 \le A1/A2 \le 0.6$, and more preferably may satisfy the relationship $0.35 \le A1/A2 \le 0.55$ to provide traction performance and uneven wear resistance in a compatible manner. The area A1 of the shoulder inclined grooves 12 being large contributes to an enhancement in traction performance. However, if this is too large, the area A2 of the shoulder blocks 22 becomes small and the rigidity is reduced. As a result, uneven wear is more likely to occur.

Additionally, the groove area ratio of the tread portion 1 is set in the range from 0.4 to 0.7. This allows traction performance and uneven wear resistance to be provided in a compatible manner. When the groove area ratio of the tread portion 1 is too small, traction performance is decreased. When the groove area ratio is too large, uneven wear resistance is decreased.

In the pneumatic tire described above, as illustrated in FIG. 2, the positions of the lug main grooves 11 are offset in the tire circumferential direction on either side of the tire equator CL, and an offset amount S of the lug main grooves 11 and a pitch P of the lug main grooves 11 in the tire circumferential direction preferably satisfies the relationship $0.3 \le S/P \le 0.5$. By offsetting the positions of the lug main grooves 11 in the tire circumferential direction on either side of the tire equator CL, a momentary increase in ground contact pressure and sudden deformation of the block end portions when the tire rotates can be suppressed, and uneven wear can be effectively suppressed. When the ratio S/P of the offset amount S of the lug main grooves 11 and the pitch P of the lug main grooves 11 in the tire circumferential direction deviates from the range described above, the effect of suppressing uneven wear is reduced.

In the pneumatic tire described above, as illustrated in FIG. 3, a groove depth D1 of the shoulder inclined grooves 12 at a central position in the longitudinal direction and a groove depth D2 of the lug main grooves 11 at a position 25% of the tread width TW from the tire equator CL preferably satisfy the relationship $0.3 \le D1/D2 \le 0.7$. Note that in the present embodiment, the shoulder inclined grooves 12 have a constant groove depth D1 throughout the entire length in the longitudinal direction. By the shoulder inclined grooves 12 being shallower than the lug main grooves 11, the traction performance at least until the intermediate stages of wear is sufficiently ensured, block rigidity near the shoulder inclined grooves 12 can be increased, and uneven wear resistance can be favorably ensured. Thus, for example, if the pneumatic tire is mounted on the drive shaft from when it is new to when it reaches the intermediate stages of wear, and then tire rotation is performed and the pneumatic tire is mounted on the driven shaft, and the effect of achieving traction performance and uneven wear resistance in a compatible manner can be maximized. Here, when the ratio D1/D2 of the groove depth D1 of the shoulder inclined grooves 12 and the groove depth D2 of the lug main grooves 11 is too small, the effect of enhancing traction performance is decreased. When the ratio D1/D2 is too large, the effect of enhancing uneven wear resistance is decreased.

In the pneumatic tire described above, as illustrated in FIG. 2, the center inclined grooves 13 connecting the lug main grooves 11 located on either side of the tire equator CL are formed, and a width W3 of the center inclined grooves 13 at the central position in the longitudinal direction and the width W1 of the lug main grooves 11 at the tread edge satisfy the relationship 0.3≤W3/W1≤0.8. By providing the center inclined grooves 13 that extend across the tire equator CL and connect the lug main grooves 11 in the center region of the tread portion 1 where the ground contact pressure is high, the grit can be discharged outward in the tire lateral direction via the lug main grooves 11, and the traction performance can be effectively enhanced. In the center region of the tread portion 1, the ground contact pressure is high and block deformation is great. However, by the center inclined grooves 13 being narrower than the lug main grooves 11 in the shoulder regions of the tread portion 1, traction performance can be enhanced without impairing uneven wear resistance. Here, when the ratio W3/W1 of the width W3 of the center inclined grooves 13 and the width W1 of the lug main grooves 11 is too small, the effect of enhancing traction performance is decreased. When the ratio W3/W1 is too large, the effect of enhancing uneven wear resistance is decreased.

In the pneumatic tire described above, as illustrated in FIG. 3, a groove depth D3 of the center inclined grooves 13 at a central position in the longitudinal direction and the groove depth D2 of the lug main grooves 11 at a position 25% of the tread width TW from the tire equator CL preferably satisfy the relationship 0.3≤D3/D2≤0.7. Note that in the present embodiment, the center inclined grooves 13 have a constant groove depth D3 throughout the entire length in the longitudinal direction. By the center inclined grooves 13 being shallower than the lug main grooves 11, the traction performance at least until the intermediate stages of wear is sufficiently ensured, block rigidity near the center inclined grooves 13 can be increased, and uneven wear resistance can be favorably ensured. Thus, for example, if the pneumatic tire is mounted on the drive shaft from when it is new to when it reaches the intermediate stages of wear, and then tire rotation is performed and the pneumatic tire is mounted on the driven shaft, and the effect of achieving traction performance and uneven wear resistance in a compatible manner can be maximized. Here, when the ratio D3/D2 of the groove depth D3 of the center inclined grooves 13 and the groove depth D2 of the lug main grooves 11 is too small, the effect of enhancing traction performance is decreased. When the ratio D3/D2 is too large, the effect of enhancing uneven wear resistance is decreased.

Figure 4:
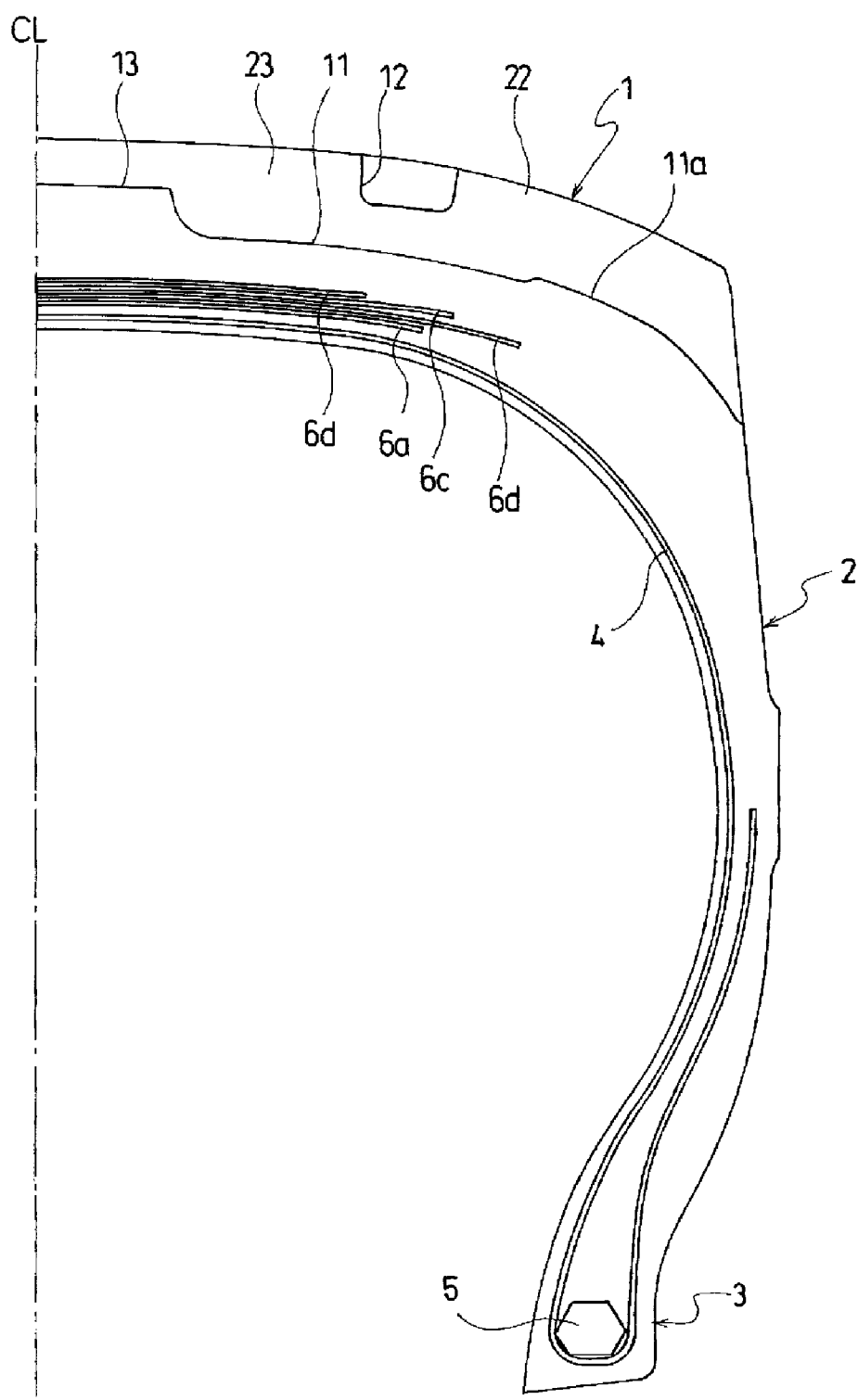
FIG. 4 is a half cross-sectional view taken along a meridian of a pneumatic tire according to another embodiment of the present technology.

FIG. 4 illustrates a pneumatic tire according to another embodiment of the present technology. In FIG. 4, components identical to those illustrated in FIGS. 1 to 3 are denoted by the same reference signs. Detailed descriptions for these components are omitted. As illustrated in FIG. 4, the pneumatic tire of the present embodiment includes a raised bottom portion 11a formed in the portion located outward from the lug main groove 11 in the tire lateral direction. Such a raised bottom portion 11a contributes to enhancing uneven wear resistance.

Figure 5:
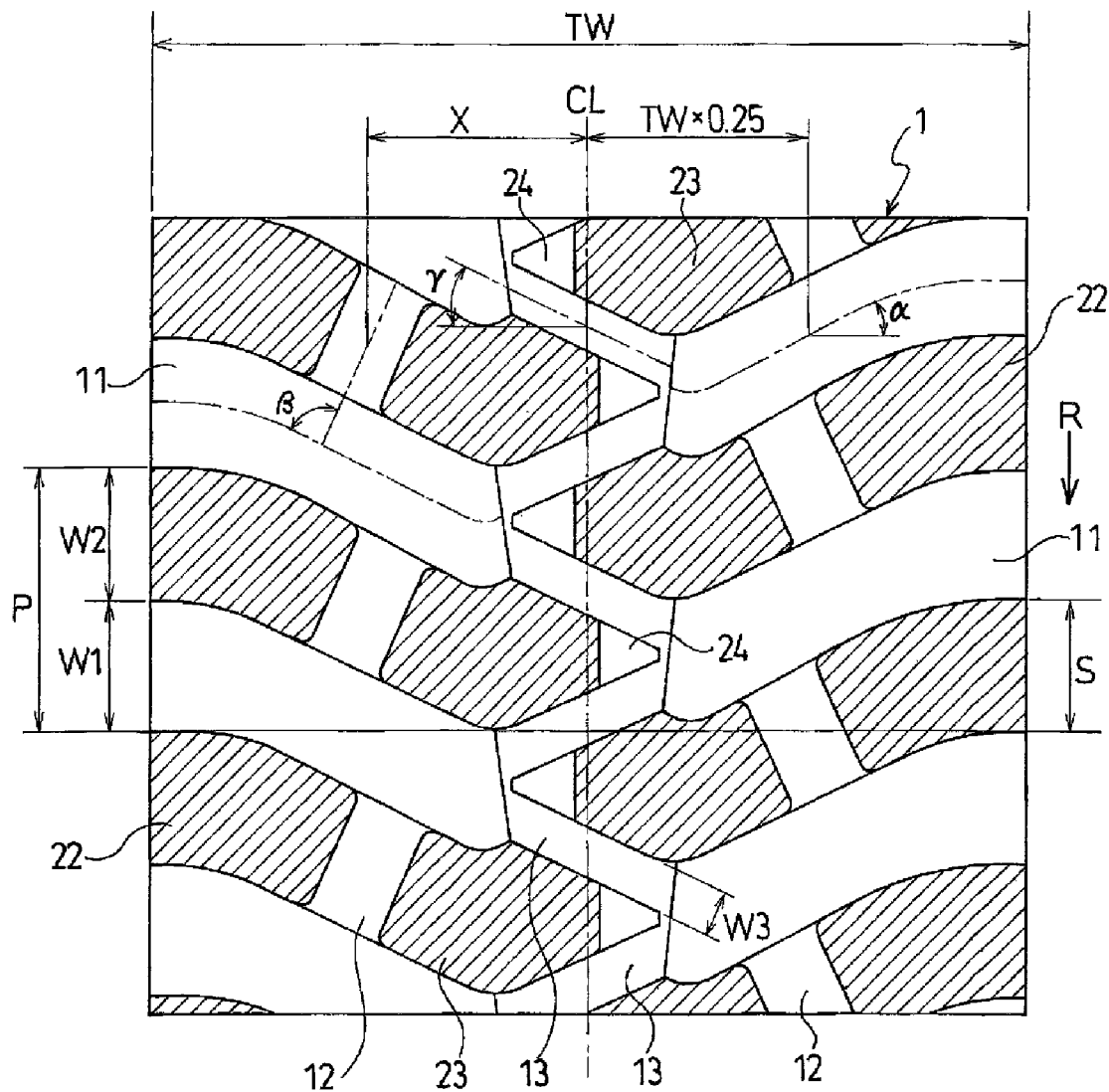
FIG. 5 is a plan view illustrating a tread pattern of a pneumatic tire according to yet another embodiment of the present technology.
Figure 6:
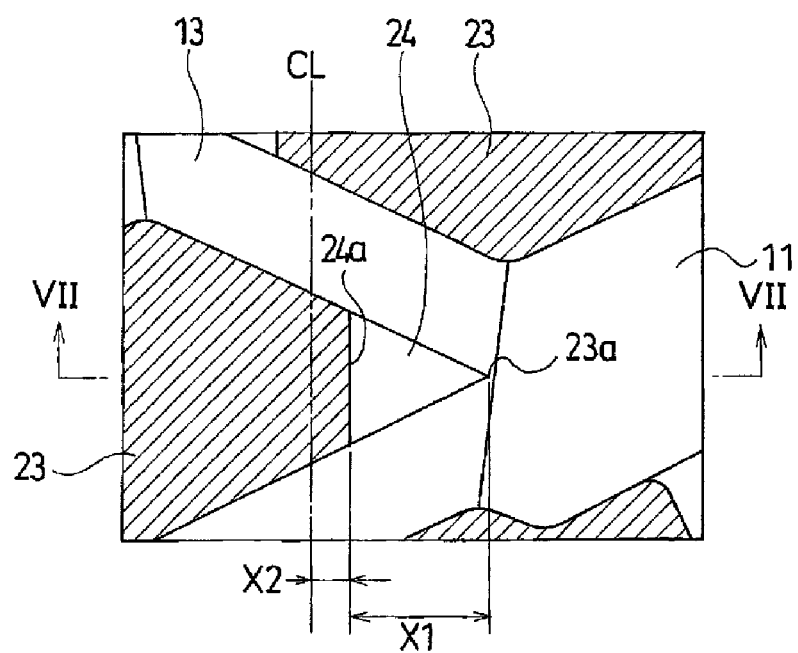
FIG. 6 is a plan view illustrating a center block of the pneumatic tire illustrated in FIG. 5.
Figure 7:
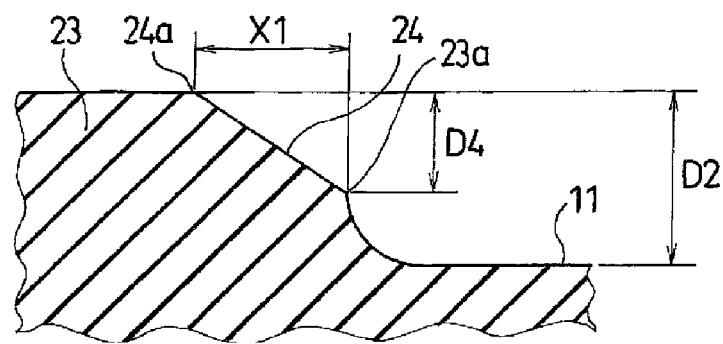
FIG. 7 is a cross-sectional view taken along line VII-VII in FIG. 6.

FIG. 5 illustrates the tread pattern of a pneumatic tire according to yet another embodiment of the present technology, and FIGS. 6 and 7 illustrate main portions thereof. In FIGS. 5 to 7, components identical to those illustrated in FIGS. 1 to 4 are denoted by the same reference signs. Detailed descriptions for these components are omitted. As illustrated in FIG. 5, in the pneumatic tire according to the present embodiment, an inclination angle γ of the center inclined grooves 13 with respect to the tire lateral direction is set in the range 10°≤γ≤40°.

Figure 8:
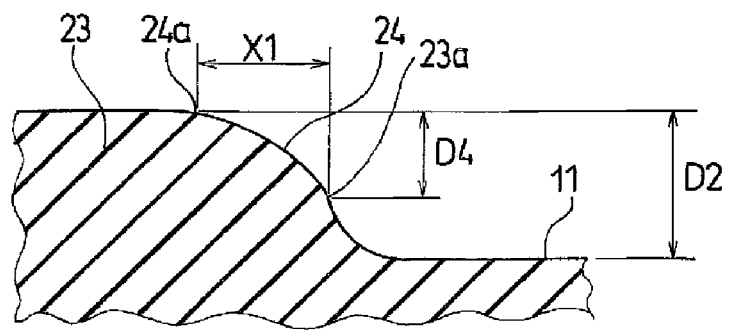
FIG. 8 is a cross-sectional view illustrating a modified example of the embodiment illustrated in FIG. 7.

In each of the center blocks 23, a chamfered portion 24 is formed in a corner portion sandwiched by two center inclined grooves 13, 13. As illustrated in FIGS. 6 and 7, the chamfered portion 24 has a structure so that the corner portion of the center block 23 is cut off obliquely. The chamfered portion 24 may be planar or may have a curved surface (for example, see FIG. 8) that projects outward in the tire radial direction. A distance X1 in the tire lateral direction from a ridge line 24a on the road contact surface of the chamfered portion 24 to an end 23a of the corner portion and the groove depth D2 of the lug main grooves 11 at a position 25% of the tread width TW from the tire equator CL preferably satisfy the relationship 0.3≤X1/D2. Note that the distance X1 is the distance in the tire lateral direction from a portion on the ridge line 24a of the chamfered portion 24 closest to the end 23a of the corner portion to the end 23a side of the corner portion.

By forming the chamfered portion 24 at the corner portion sandwiched by the two center inclined grooves 13, 13 having the inclination angle γ in each of the center blocks 23 and by sufficiently ensuring the distance X1 in the tire lateral direction between the ridge line 24a on the road contact surface of the chamfered portion 24 and the end 23a of the corner portion, the traction performance and uneven wear resistance can be further improved.

In other words, by providing the center inclined grooves 13 that connect the lug main grooves 11 located on either side of the tire equator CL in the center region of the tread portion 1 where the ground contact pressure is high, by each of the lug main grooves 11 communicating with two other lug main grooves 11 via two center inclined grooves 13, and by the inclination angle γ of the center inclined grooves 13 with respect to the tire lateral direction being set in the range 10°≤γ≤40°, the grit can be discharged outward in the tire lateral direction via the lug main grooves 11, and the traction performance can be effectively enhanced. Here, when the inclination angle γ of the center inclined groove 13 with respect to the tire lateral direction is too small, the rigidity of the corner portions of the center blocks 23 is decreased, reducing uneven wear resistance. When the inclination angle γ is too large, the effect of enhancing traction performance is insufficient.

In addition, in the case of the center inclined grooves 13 being provided as described above, the corner portions sandwiched by two center inclined grooves 13 of each center block 23 are acute. Thus, uneven wear is likely to occur in this portion. However, by forming the chamfered portions 24 in the corner portions sandwiched by two center inclined grooves 13, uneven wear of the center blocks 23 can be suppressed without impairing traction performance.

In particular, by the distance X1 in the tire lateral direction from a ridge line 24a on the road contact surface of the chamfered portion 24 to an end 23a of the corner portion of the center block 23 and the groove depth D2 of the lug main grooves 11 at a position 25% of the tread width TW from the tire equator CL satisfying the relationship 0.3≤X1/D2 and more preferably satisfying 0.3≤X1/D2≤3.0, traction performance and uneven wear resistance can be favorably maintained. Here, when the ratio X1/D2 of the distance X1 and the groove depth D2 of the lug main grooves 11 is too small, the effect of enhancing uneven wear resistance is decreased. When the ratio X1/D2 is too large, the effect of enhancing traction performance is decreased.

In the pneumatic tire described above, as illustrated in FIG. 6, preferably at least a portion of the ridge line 24a on the road contact surface of the chamfered portion 24 is located on the side of the tire equator CL where the end 23a of the corner portion is located, and a maximum separation amount X2 of the ridge line 24a from the tire equator CL and the groove depth D2 of the lug main grooves 11 at a position 25% of the tread width from the tire equator CL satisfy the relationship $0<X2/D2\leq1.0$ and more preferably satisfy the relationship $0.1\leq X2/D2\leq0.7$. By at least a portion of the ridge line 24a on the road contact surface of the chamfered portion 24 being located on the side of the tire equator CL where the end 23a of the corner portion is located, the center blocks 23, 23 on either side of the tire equator CL overlap in the tire lateral direction over a range of two times the maximum separation amount X2. Thus, uneven wear of the center blocks 23 can be suppressed without impairing traction performance. Here, when the ratio X2/D2 of the maximum separation amount X2 of the ridge line 24a and the groove depth D2 of the lug main grooves 11 is too small, the effect of enhancing traction performance is decreased. When the ratio X2/D2 is too large, forming the chamfered portion 24 may be difficult.

Figure 9:
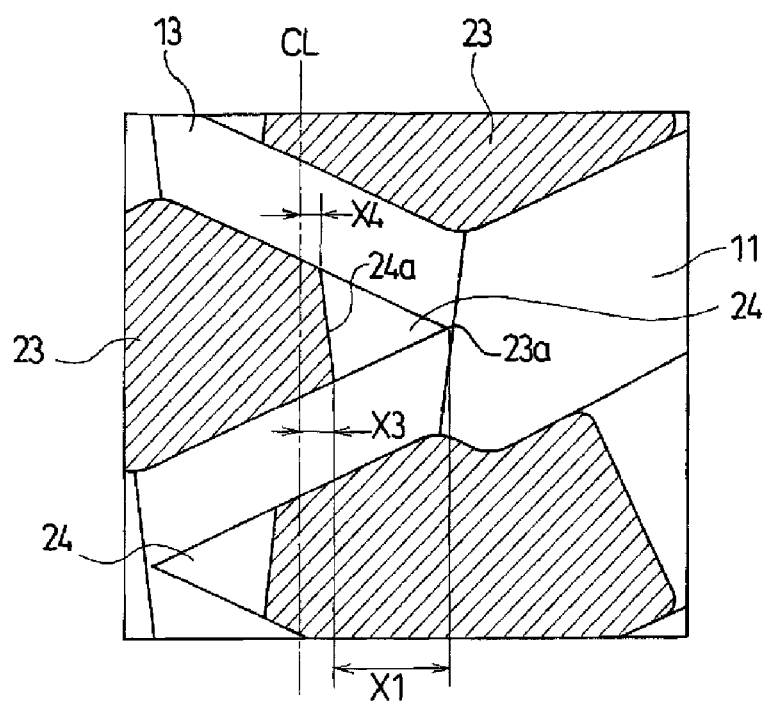
FIG. 9 is a plan view illustrating a center block according to a modified example.

FIG. 9 illustrates the center block 23 of a modified example. In the example of FIG. 6 described above, the ridge line 24a on the road contact surface of the chamfered portion 24 extends parallel with the tire equator CL. In the example of FIG. 9, the ridge line 24a on the road contact surface of the chamfered portion 24 is inclined with respect to the tire equator CL. Both end points of the ridge line 24a on the road contact surface of the chamfered portion 24 are located on the side of the tire equator CL where the end 23a of the corner portion is located, and a separation amount X3 from the tire equator CL at one end point and a separation amount X4 from the tire equator CL at the other end point satisfy the relationship $0\leq X4/X3\leq1.0$. In FIG. 7, the separation amount X3 is equivalent to the maximum separation amount X2. Additionally, X3=X4 may be used. In this case, the center block 23 is formed with an appropriate obtuse angle at both end points of the ridge line 24a on the road contact surface of the chamfered portion 24. This allows the uneven wear of the center blocks 23 to be effectively suppressed.

Figure 10:
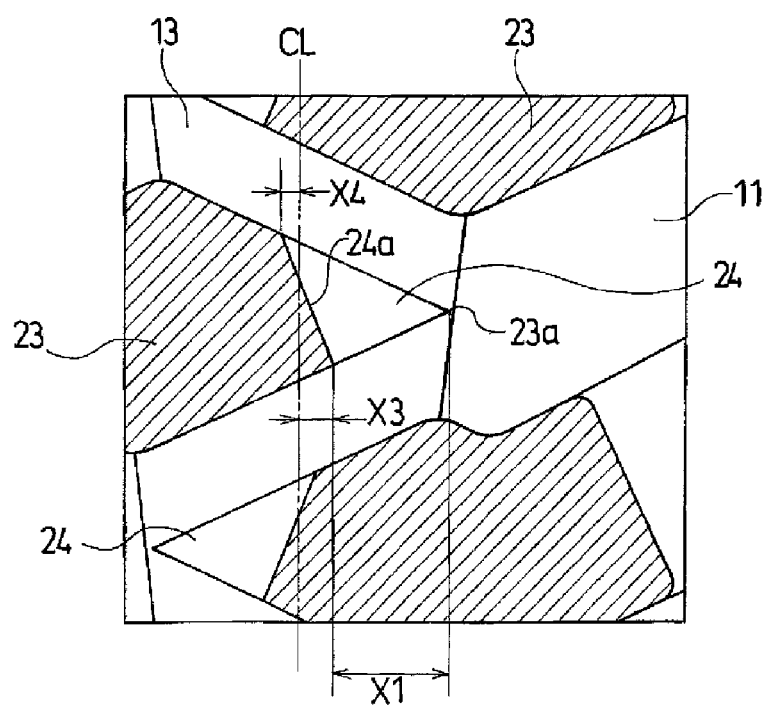
FIG. 10 is a plan view illustrating a center block according to another modified example.

FIG. 10 illustrates the center block 23 of another modified example. In FIG. 10, only one end point of the two edge points of the ridge line 24a on the road contact surface of the chamfered portion 24 is located on the side of the tire equator CL where the end 23a of the corner portion is located, and a separation amount X3 from the tire equator CL at one end point and a separation amount X4 from the tire equator CL at the other end point satisfy the relationship $-1.0\leq X4/X3\leq0$. In FIG. 10, the separation amount X3 is equivalent to the maximum separation amount X2. Here, in the case of the end point of the ridge line 24a being located on the side of the tire equator CL where the end 23a of the corner portion is located, the separation amount is a positive value, and the case of the end point of the ridge line 24a being located on the opposite side from the side of the tire equator CL where the end 23a of the corner portion is located, the separation amount is a negative value. In an example in which the ridge line 24a on the road contact surface of the chamfered portion 24 is inclined greatly with respect to the tire equator CL, the ridge line 24a of the chamfered portion 24 is increased in length, thus enhancing traction performance. Also, by the absolute value of the separation amount X4 being less than the separation amount X3, the overlapping of the center blocks 23, 23 on either side of the tire equator CL in the tire lateral direction can be maintained.

Figure 11:
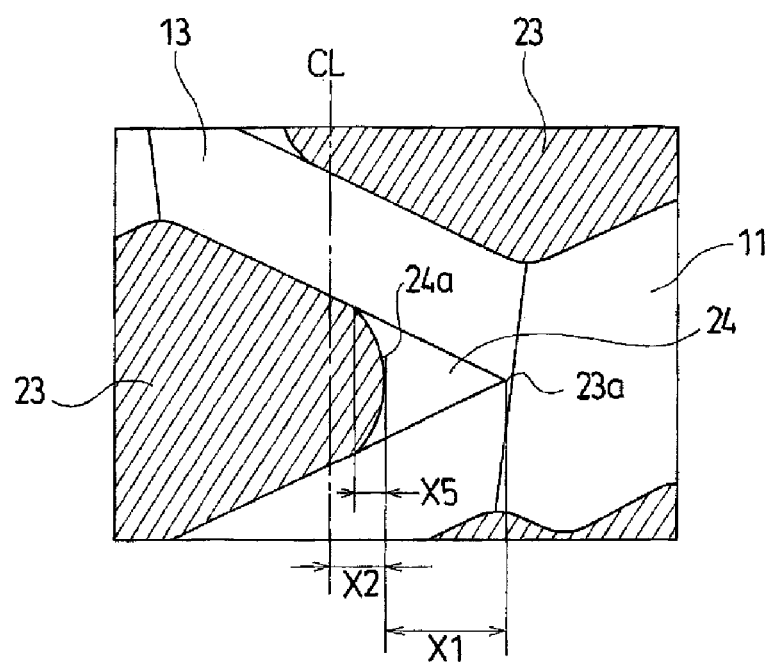
FIG. 11 is a plan view illustrating a center block according to yet another modified example.

FIG. 11 illustrates the center block 23 of yet another modified example. In FIG. 11, the ridge line 24a on the road contact surface of the chamfered portion 24 is a curve, projecting toward the end 23a of the corner portion, and the protruding amount X5 of the curve and the groove depth D2 of the lug main grooves 11 at a position 25% of the tread width TW from the tire equator CL satisfy the relationship $0.05\leq X5/D2\leq1.0$. The protruding amount X5 of the curve is the amount the ridge line 24a protrudes out with respect to a straight line connecting both end points of the ridge line 24a. By the ridge line 24a on the road contact surface of the chamfered portion 24 being curved in this manner, the uneven wear of the center blocks 23 where the ground contact pressure is high can be effectively suppressed. Here, when the ratio X5/D2 of the protruding amount X5 of the ridge line 24a of the chamfered portion 24 and the groove depth D2 of the lug main grooves 11 is too small, the effect of enhancing uneven wear resistance is decreased. When the ratio X5/D2 is too large, forming the chamfered portion 24 may be difficult.

In the pneumatic tire described above, a depth D4 of the chamfered portion 24 and the groove depth D2 of the lug main grooves 11 at a position 25% of the tread width from the tire equator CL preferably satisfy the relationship $0.3\leq D4/D2\leq0.7$. By the chamfered portion 24 being shallower than the lug main grooves 11, the uneven wear resistance can be favorably ensured without impairing the rigidity of the center blocks 23 at least until the intermediate stages of wear. Here, when the ratio D4/D2 of the depth D4 of the chamfered portion 24 and the groove depth D2 of the lug main grooves 11 is too small, the effect of enhancing uneven wear resistance is decreased. When the ratio D4/D2 is too large, the effect of enhancing traction performance is decreased.

Figure 12:
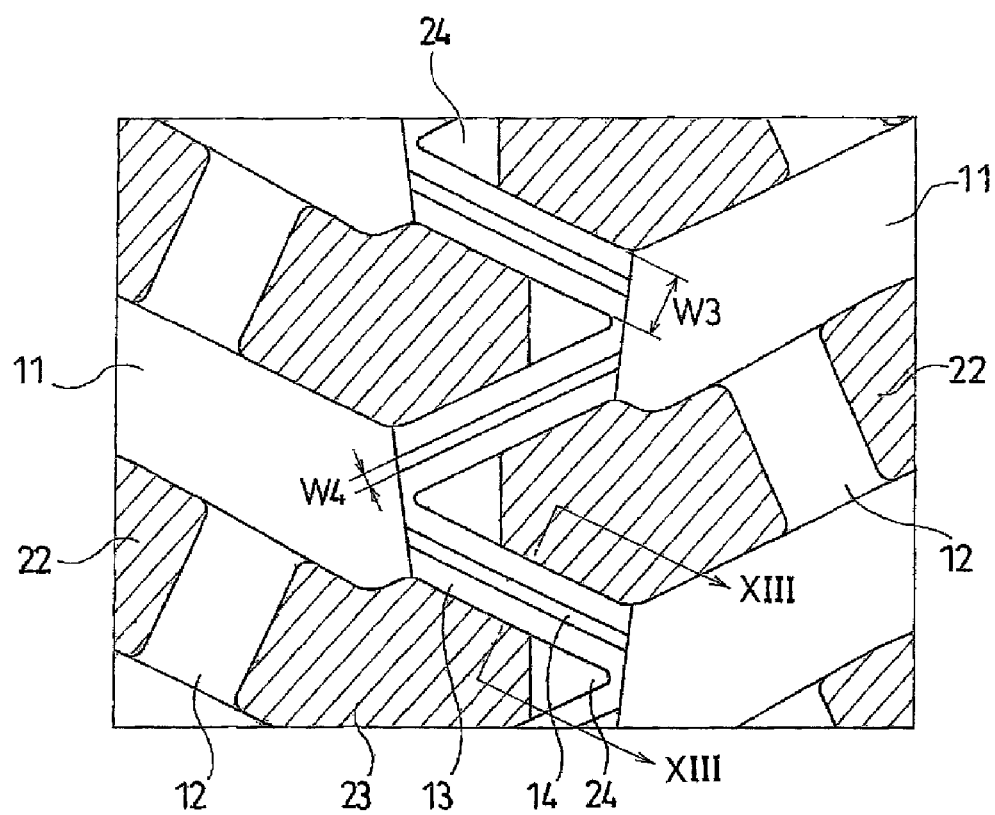
FIG. 12 is a plan view illustrating a center region of a tread pattern of a pneumatic tire according to yet another embodiment of the present technology.
Figure 13:
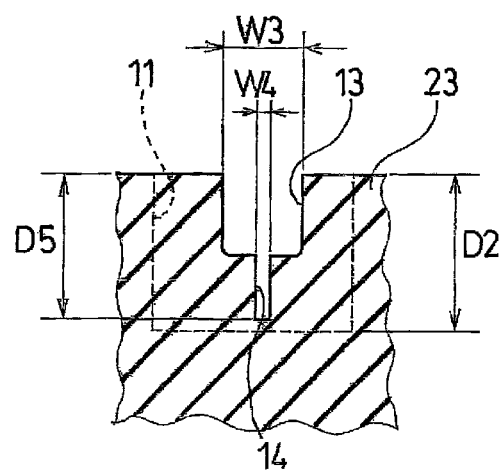
FIG. 13 is a cross-sectional view taken along line XIII-XIII of FIG. 12.

FIG. 12 illustrates a center region of a tread pattern of a pneumatic tire according to yet another embodiment of the present technology, and FIG. 13 illustrates a cross section of a main portion thereof. In FIGS. 12 and 13, components which are the same as those illustrated in FIGS. 1 to 11 are denoted by the same reference signs. Detailed descriptions for these components will be omitted. As illustrated in FIG. 12, narrow grooves 14 that open at both ends to the lug main grooves 11 are formed in the bottom portion of the center inclined grooves 13. The narrow grooves 14 extend in the longitudinal direction of the center inclined grooves 13 at the center position in the width direction of the center inclined grooves 13. A width W4 of the narrow grooves 14 and a width W3 of the center inclined grooves 13 at a central position in the longitudinal direction satisfy the relationship $0.05\leq W4/W3\leq0.5$, and more preferably the relationship $0.1\leq W4/W3\leq0.3$.

By providing the narrow groove 14 in the bottom portion of the center inclined groove 13 disposed in the center region of the tread portion 1 where the ground contact pressure is high in this way, the groove area from the intermediate stages of wear onward is ensured and traction performance can be favorably maintained. In other words, even if the rigidity of the center blocks 23 is increased and uneven wear resistance is ensured by the center inclined grooves 13 being shallower than the lug main grooves 11, traction performance and uneven wear resistance can be achieved in a compatible manner.

As illustrated in FIG. 13, a groove depth D5 of the narrow groove 14 at a central position in the longitudinal direction, with the road contact surface of the tread portion 1 as a reference, and the groove depth D2 of the lug main grooves 11 at a position 25% of the tread width TW from the tire equator CL preferably satisfy the relationship $0.5 \leq D5/D2 \leq 1.0$. By specifying the groove depth D5 of the narrow groove 14 in this manner, the groove area from the intermediate stages of wear onward is ensured and traction performance can be favorably maintained. Here, when the ratio D5/D2 of the groove depth D5 of the narrow groove 14 and the groove depth D2 of the lug main grooves 11 is too small, the effect of enhancing the traction performance from the intermediate stages of wear onward is decreased. When the ratio D5/D2 is too large, the durability of the tread portion 1 is reduced.

The pneumatic tire according to an embodiment of the present technology has various applications, is suitable for construction vehicles, and is particularly suitable for a scraper vehicle.

EXAMPLES

Pneumatic tires according to Comparative Examples 2 to 12 and Examples 1 to 12 were manufactured. The pneumatic tires have a tire size of 37.25R35, have a directional tread pattern such as that illustrated in FIG. 2, and include an annular tread portion that extends in the tire circumferential direction, a pair of sidewall portions disposed on both sides of the tread portion, and a pair of bead portions disposed inward of the sidewall portions in the tire radial direction. Also, the tires are set according to Tables 1 to 3 for the following: inclination angle α of lug main grooves with respect to the tire lateral direction at a position 25% of the tread width from the tire equator, ratio W1/W2 of the width W1 of the lug main grooves at the tread edge and the interval W2 between lug main grooves at the tread edge, center position of the shoulder inclined grooves (ratio of the distance X from the tire equator to the center position of the shoulder inclined groove to the tread width TW), inclination angle β of the shoulder inclined grooves with respect to the lug main grooves, ratio A1/A2 of the area A1 of the shoulder inclined grooves and the area A2 of the shoulder blocks, groove area ratio of the tread portion, ratio S/P of the offset amount S of the lug main grooves and the pitch P of the lug main grooves in the tire circumferential direction, ratio W3/W1 of the width W3 of the center inclined grooves at a central position in the longitudinal direction and the width W1 of the lug main grooves at the tread edge, ratio D1/D2 of the groove depth D1 of the shoulder inclined grooves at a central position in the longitudinal direction and the groove depth D2 of the lug main grooves at a position 25% of the tread width from the tire equator, and ratio D3/D2 of the groove depth D3 of the center inclined grooves at a central position in the longitudinal direction and the groove depth D2 of the lug main grooves at a position 25% of the tread width from the tire equator. However, Example 7 is an example without center inclined grooves.

For comparison, a tire according to Conventional Example 1 was prepared. This tire includes a non-directional tread pattern in which lug main grooves extending in the tire lateral direction and opening to the tread edges are formed in the tread portion on either side of the tire equator, and the lug main grooves are inclined in the same direction with respect to the tire lateral direction on either side of the tire equator. Also, a tire according Comparative Example 1 was prepared. The tire has the same configuration as Example 1 except that the lug main grooves are inclined in the same direction with respect to the tire lateral direction on either side of the tire equator.

These test tires were evaluated for traction performance and uneven wear resistance according to the following evaluation methods. The results thereof are shown in Tables 1 to 3.

Traction Performance:

Each of the test tires was mounted on a rim, adjusted to an air pressure of 525 kPa, and mounted on a scraper vehicle. The slip ratio of the tires was measured when the scraper vehicle performed leveling of a road surface. Here, the slip ratio (S) of the tire can be calculated based on the formula $S=[(V2-V1)/V2]/100\%$ using the measured speed of the vehicle (V1) and the speed of the tire outer circumferential surface (V2). The evaluation results are expressed as index values using the reciprocal of the measurement values, with the Conventional Example 1 being assigned the index value of 100. Larger index values indicate superior traction performance.

Uneven Wear Resistance:

Each of the test tires was mounted on a rim, adjusted to an air pressure of 525 kPa, and mounted on a scraper vehicle. The amount of uneven wear on the tread portion was measured after the scraper vehicle continuously performed leveling of a road surface under the same conditions. The evaluation results are expressed as index values using the reciprocal of the measurement values, with the Conventional Example 1 being assigned the index value of 100. Larger index values indicate superior uneven wear resistance.

TABLE 1-1

|  | Conventional Example 1 | Comparative Example 1 | Comparative Example 2 | Comparative Example 3 | Comparative Example 4 |
|---|---|---|---|---|---|
| Directional tread pattern | Non-directional | Non-directional | Directional | Directional | Directional |
| Inclination angle α of lug main grooves (°) | 30 | 30 | 10 | 50 | 30 |
| Ratio W1/W2 | 1.0 | 1.0 | 1.0 | 1.0 | 0.5 |
| Center position of shoulder inclined groove | — | 0.25TW | 0.25TW | 0.25TW | 0.25TW |
| Inclination angle β of shoulder inclined groove (°) | — | 90 | 90 | 90 | 90 |
| Ratio A1/A2 | — | 0.4 | 0.4 | 0.4 | 0.4 |
| Groove area ratio of tread portion | 0.6 | 0.6 | 0.6 | 0.6 | 0.6 |
| Ratio S/P | — | — | 0.5 | 0.5 | 0.5 |

TABLE 1-1-continued

|  | Conventional Example 1 | Comparative Example 1 | Comparative Example 2 | Comparative Example 3 | Comparative Example 4 |
|---|---|---|---|---|---|
| Ratio W3/W1 | — | 0.5 | 0.5 | 0.5 | 0.5 |
| Ratio D1/D2 | — | 0.5 | 0.5 | 0.5 | 0.5 |
| Ratio D3/D2 | — | 0.5 | 0.5 | 0.5 | 0.5 |
| Traction performance (index value) | 100 | 90 | 90 | 90 | 90 |
| Uneven wear resistance (index value) | 100 | 115 | 127 | 98 | 138 |

TABLE 1-2

|  | Comparative Example 5 | Comparative Example 6 | Comparative Example 7 | Comparative Example 8 |
|---|---|---|---|---|
| Directional tread pattern | Directional | Directional | Directional | Directional |
| Inclination angle $\alpha$ of lug main grooves (°) | 30 | 30 | 30 | 30 |
| Ratio W1/W2 | 1.7 | 1.0 | 1.0 | 1.0 |
| Center position of shoulder inclined groove | 0.25TW | 0.10TW | 0.40TW | 0.25TW |
| Inclination angle $\beta$ of shoulder inclined groove (°) | 90 | 90 | 90 | 50 |
| Ratio A1/A2 | 0.4 | 0.4 | 0.4 | 0.4 |
| Groove area ratio of tread portion | 0.6 | 0.6 | 0.6 | 0.6 |
| Ratio S/P | 0.5 | 0.5 | 0.5 | 0.5 |
| Ratio W3/W1 | 0.5 | 0.5 | 0.5 | 0.5 |
| Ratio D1/D2 | 0.5 | 0.5 | 0.5 | 0.5 |
| Ratio D3/D2 | 0.5 | 0.5 | 0.5 | 0.5 |
| Traction performance (index value) | 144 | 120 | 120 | 120 |
| Uneven wear resistance (index value) | 81 | 86 | 75 | 92 |

TABLE 2-1

|  | Comparative Example 9 | Comparative Example 10 | Comparative Example 11 | Comparative Example 12 |
|---|---|---|---|---|
| Directional tread pattern | Directional | Directional | Directional | Directional |
| Inclination angle $\alpha$ of lug main grooves (°) | 30 | 30 | 30 | 30 |
| Ratio W1/W2 | 1.0 | 1.0 | 1.0 | 1.0 |
| Center position of shoulder inclined groove | 0.25TW | 0.25TW | 0.25TW | 0.25TW |
| Inclination angle $\beta$ of shoulder inclined groove (°) | 90 | 90 | 90 | 90 |
| Ratio A1/A2 | 0.1 | 0.7 | 0.4 | 0.4 |
| Groove area ratio of tread portion | 0.6 | 0.6 | 0.3 | 0.8 |
| Ratio S/P | 0.5 | 0.5 | 0.5 | 0.5 |
| Ratio W3/W1 | 0.5 | 0.5 | 0.5 | 0.5 |
| Ratio D1/D2 | 0.5 | 0.5 | 0.5 | 0.5 |
| Ratio D3/D2 | 0.5 | 0.5 | 0.5 | 0.5 |

TABLE 2-1-continued

|  | Comparative Example 9 | Comparative Example 10 | Comparative Example 11 | Comparative Example 12 |
|---|---|---|---|---|
| Traction performance (index value) | 84 | 138 | 90 | 144 |
| Uneven wear resistance (index value) | 150 | 81 | 150 | 81 |

TABLE 2-2

|  | Example 1 | Example 2 | Example 3 | Example 4 |
|---|---|---|---|---|
| Directional tread pattern | Directional | Directional | Directional | Directional |
| Inclination angle $\alpha$ of lug main grooves (°) | 30 | 30 | 30 | 30 |
| Ratio W1/W2 | 1.0 | 0.8 | 1.3 | 1.0 |
| Center position of shoulder inclined groove | 0.25TW | 0.25TW | 0.25TW | 0.25TW |
| Inclination angle $\beta$ of shoulder inclined groove (°) | 90 | 90 | 90 | 90 |
| Ratio A1/A2 | 0.4 | 0.4 | 0.4 | 0.4 |
| Groove area ratio of tread portion | 0.6 | 0.6 | 0.6 | 0.6 |
| Ratio S/P | 0.5 | 0.5 | 0.5 | 0.5 |
| Ratio W3/W1 | 0.5 | 0.5 | 0.5 | 0.5 |
| Ratio D1/D2 | 0.5 | 0.5 | 0.5 | 0.5 |
| Ratio D3/D2 | 0.5 | 0.5 | 0.5 | 0.5 |
| Traction performance (index value) | 120 | 102 | 132 | 120 |
| Uneven wear resistance (index value) | 115 | 127 | 104 | 104 |

TABLE 3-1

|  | Example 5 | Example 6 | Example 7 | Example 8 |
|---|---|---|---|---|
| Directional tread pattern | Directional | Directional | Directional | Directional |
| Inclination angle $\alpha$ of lug main grooves (°) | 30 | 30 | 30 | 30 |

TABLE 3-1-continued

|  | Example 5 | Example 6 | Example 7 | Example 8 |
|---|---|---|---|---|
| Ratio W1/W2 | 1.0 | 1.0 | 1.0 | 1.0 |
| Center position of shoulder inclined groove | 0.25TW | 0.25TW | 0.25TW | 0.25TW |
| Inclination angle β of shoulder inclined groove (°) | 90 | 90 | 90 | 90 |
| Ratio A1/A2 | 0.4 | 0.4 | 0.4 | 0.4 |
| Groove area ratio of tread portion | 0.6 | 0.6 | 0.6 | 0.6 |
| Ratio S/P | 0 | 0.2 | 0.5 | 0.5 |
| Ratio W3/W1 | 0.5 | 0.5 | — | 0.9 |
| Ratio D1/D2 | 0.5 | 0.5 | 0.5 | 0.5 |
| Ratio D3/D2 | 0.5 | 0.5 | 0.5 | 0.5 |
| Traction performance (index value) | 132 | 122 | 106 | 132 |
| Uneven wear resistance (index value) | 100 | 107 | 127 | 101 |

TABLE 3-2

|  | Example 9 | Example 10 | Example 11 | Example 12 |
|---|---|---|---|---|
| Directional tread pattern | Directional | Directional | Directional | Directional |
| Inclination angle α of lug main grooves (°) | 30 | 30 | 30 | 30 |
| Ratio W1/W2 | 1.0 | 1.0 | 1.0 | 1.0 |
| Center position of shoulder inclined groove | 0.25TW | 0.25TW | 0.25TW | 0.25TW |
| Inclination angle β of shoulder inclined groove (°) | 90 | 90 | 90 | 90 |
| Ratio A1/A2 | 0.4 | 0.4 | 0.4 | 0.4 |
| Groove area ratio of tread portion | 0.6 | 0.6 | 0.6 | 0.6 |
| Ratio S/P | 0.5 | 0.5 | 0.5 | 0.5 |
| Ratio W3/W1 | 0.5 | 0.5 | 0.5 | 0.5 |
| Ratio D1/D2 | 0.2 | 0.8 | 0.5 | 0.5 |
| Ratio D3/D2 | 0.5 | 0.5 | 0.2 | 0.8 |
| Traction performance (index value) | 102 | 138 | 102 | 138 |
| Uneven wear resistance (index value) | 127 | 104 | 127 | 104 |

As is clear from Tables 1 to 3, as compared with Conventional Example 1, with each of the tires of Examples 1 to 12, traction performance and uneven wear resistance were superior. In contrast, with the tires of Comparative Examples 1 to 4, 9, and 11, although there was no problem with uneven wear resistance, traction performance was greatly reduced. In addition, although the tires of Comparative Examples 5 to 8, 10, and 12 did not have a problem with traction performance, uneven wear resistance was greatly reduced.

Pneumatic tires according to Comparative Examples 22 to 37 and Examples 21 to 39 were manufactured. The pneumatic tires have a tire size of 37.25R35, have a directional tread pattern such as that illustrated in FIG. 5, and include an annular tread portion that extends in the tire circumferential direction, a pair of sidewall portions disposed on both sides of the tread portion, and a pair of bead portions disposed inward of the sidewall portions in the tire radial direction. Also, the tires are set according to Tables 4 to 7 for the following: inclination angle α of lug main grooves with respect to the tire lateral direction at a position 25% of the tread width from the tire equator, ratio W1/W2 of the width W1 of the lug main grooves at the tread edge and the interval W2 between lug main grooves at the tread edge, shoulder inclined grooves opening to the lug main grooves, inclination direction of the shoulder inclined grooves with respect to the lug main grooves, groove area ratio of the tread portion, ratio S/P of the offset amount S of the lug main grooves and the pitch P of the lug main grooves in the tire circumferential direction, inclination angle γ of the center inclined grooves with respect to the tire lateral direction, ratio W3/W1 of the width W3 of the center inclined grooves at a central position in the longitudinal direction and the width W1 of the lug main grooves at the tread edge, ratio X1/D2 of the distance X1 in the tire lateral direction from the end of the corner portion of the center block to the ridge line on the road contact surface of the chamfered portion and the groove depth D2 of the lug main grooves at a position 25% of the tread width from the tire equator, ratio X2/D2 of the maximum separation amount X2 of the ridge line on the road contact surface of the chamfered portion from the tire equator and the groove depth D2 of the lug main grooves, ratio X4/X3 of the separation amount X3 (maximum value) from the tire equator of one end point of the ridge line on the road contact surface of the chamfered portion and the separation amount X4 (minimum value) from the tire equator of the other end point, ratio X5/D2 of the protruding amount X5 of the ridge line on the road contact surface of the chamfered portion and the groove depth D2 of the lug main grooves, ratio D4/D2 of the depth D4 of the chamfered portion and the groove depth D2 of the lug main grooves, ratio D3/D2 of the groove depth D3 of the center inclined grooves at a central position in the longitudinal direction and the groove depth D2 of the lug main grooves, center position of the shoulder inclined grooves (ratio X/TW of the distance X from the tire equator to the center position of the shoulder inclined groove and the tread width TW), inclination angle β of the shoulder inclined grooves with respect to the lug main grooves, ratio A1/A2 of the area A1 of the shoulder inclined grooves and the area A2 of the shoulder blocks, ratio D1/D2 of the groove depth D1 of the shoulder inclined grooves at a central position in the longitudinal direction and the groove depth D2 of the lug main grooves, ratio W4/W3 of the width W4 of the narrow groove and the width W3 of the center inclined groove at a central position in the longitudinal direction, and ratio D5/D2 of the groove depth D5 of the narrow groove and the groove depth D2 of the lug main grooves.

For comparison, a tire according to Conventional Example 21 was prepared. This tire includes a non-directional tread pattern in which lug main grooves extending in the tire lateral direction and opening to the tread edges are formed in the tread portion on either side of the tire equator, and the lug main grooves are inclined in the same direction with respect to the tire lateral direction on either side of the tire equator. Also, a tire according Comparative Example 21 was prepared. The tire has the same configuration as Example 1 except that the lug main grooves are inclined in the same direction with respect to the tire lateral direction on either side of the tire equator.

These test tires were evaluated for traction performance and uneven wear resistance according to the following evaluation methods. The results thereof are shown in Tables 4 to 7.

Traction Performance:

Each of the test tires was mounted on a rim, adjusted to an air pressure of 525 kPa, and mounted on a scraper vehicle. The slip ratio of the tires was measured when the scraper vehicle performed leveling of a road surface. Here, the slip ratio (S) of the tire can be calculated based on the formula S=[(V2−V1)/V2]/100% using the measured speed of the vehicle (V1) and the speed of the tire outer circumferential surface (V2). The evaluation results are expressed as index values using the reciprocal of the measurement values, with the Conventional Example 21 being assigned the index value of 100. Larger index values indicate superior traction performance.

Uneven Wear Resistance:

Each of the test tires was mounted on a rim, adjusted to an air pressure of 525 kPa, and mounted on a scraper vehicle. The amount of uneven wear on the tread portion was measured after the scraper vehicle continuously performed leveling of a road surface under the same conditions. The evaluation results are expressed as index values using the reciprocal of the measurement values, with the Conventional Example 21 being assigned the index value of 100. Larger index values indicate superior uneven wear resistance.

TABLE 4-1

|  | Conventional Example 21 | Comparative Example 21 | Comparative Example 22 | Comparative Example 23 | Comparative Example 24 |
|---|---|---|---|---|---|
| Directional tread pattern | Non-directional | Non-directional | Directional | Directional | Directional |
| Inclination angle α of lug main grooves (°) | 30 | 30 | 10 | 50 | 30 |
| Ratio W1/W2 | 1.0 | 1.0 | 1.0 | 1.0 | 0.5 |
| Shoulder inclined grooves opening | — | Yes | Yes | Yes | Yes |
| Inclination direction of shoulder inclined grooves | — | Opposite direction | Opposite direction | Opposite direction | Opposite direction |
| Groove area ratio of tread portion | 0.6 | 0.6 | 0.6 | 0.6 | 0.6 |
| Ratio S/P | 0 | 0 | 0.5 | 0.5 | 0.5 |
| Inclination angle γ of center inclined grooves (°) | — | 30 | 30 | 30 | 30 |
| Ratio W3/W1 | — | 0.5 | 0.5 | 0.5 | 0.5 |
| Ratio X1/D2 | 0 | 1.0 | 1.0 | 1.0 | 1.0 |
| Ratio X2/D2 | — | 0.2 | 0.2 | 0.2 | 0.2 |
| Ratio X4/X3 | — | 0.5 | 0.5 | 0.5 | 0.5 |
| Ratio X5/D2 | — | 0.5 | 0.5 | 0.5 | 0.5 |
| Ratio D4/D2 | — | 0.5 | 0.5 | 0.5 | 0.5 |
| Ratio D3/D2 | — | 0.5 | 0.5 | 0.5 | 0.5 |
| Center position of shoulder inclined groove (X/TW) | — | 0.25 | 0.25 | 0.25 | 0.25 |
| Inclination angle β of shoulder inclined groove (°) | — | 90 | 90 | 90 | 90 |
| Ratio A1/A2 | — | 0.4 | 0.4 | 0.4 | 0.4 |
| Ratio D1/D2 | — | 0.5 | 0.5 | 0.5 | 0.5 |
| Ratio W4/W3 | — | — | — | — | — |
| Ratio D5/D2 | — | — | — | — | — |
| Traction performance (index value) | 100 | 90 | 90 | 90 | 90 |
| Uneven wear resistance (index value) | 100 | 115 | 127 | 98 | 138 |

TABLE 4-2

|  | Comparative Example 25 | Comparative Example 26 | Comparative Example 27 | Comparative Example 28 |
|---|---|---|---|---|
| Directional tread pattern | Directional | Directional | Directional | Directional |
| Inclination angle α of lug main grooves (°) | 30 | 30 | 30 | 30 |
| Ratio W1/W2 | 1.7 | 1.0 | 1.0 | 1.0 |
| Shoulder inclined grooves opening | Yes | No | Yes | Yes |
| Inclination direction of shoulder inclined grooves | Opposite direction | Opposite direction | Same direction | Opposite direction |
| Groove area ratio of tread portion | 0.6 | 0.6 | 0.6 | 0.3 |
| Ratio S/P | 0.5 | 0.5 | 0.5 | 0.5 |
| Inclination angle γ of center inclined grooves (°) | 30 | 30 | 30 | 30 |
| Ratio W3/W1 | 0.5 | 0.5 | 0.5 | 0.5 |
| Ratio X1/D2 | 1.0 | 1.0 | 1.0 | 1.0 |
| Ratio X2/D2 | 0.2 | 0.2 | 0.2 | 0.2 |
| Ratio X4/X3 | 0.5 | 0.5 | 0.5 | 0.5 |

TABLE 4-2-continued

|  | Comparative Example 25 | Comparative Example 26 | Comparative Example 27 | Comparative Example 28 |
|---|---|---|---|---|
| Ratio X5/D2 | 0.5 | 0.5 | 0.5 | 0.5 |
| Ratio D4/D2 | 0.5 | 0.5 | 0.5 | 0.5 |
| Ratio D3/D2 | 0.5 | 0.5 | 0.5 | 0.5 |
| Center position of shoulder inclined groove (X/TW) | 0.25 | 0.25 | 0.25 | 0.25 |
| Inclination angle β of shoulder inclined groove (°) | 90 | 90 | 150 | 90 |
| Ratio A1/A2 | 0.4 | 0.4 | 0.4 | 0.4 |
| Ratio D1/D2 | 0.5 | 0.5 | 0.5 | 0.5 |
| Ratio W4/W3 | — | — | — | — |
| Ratio D5/D2 | — | — | — | — |
| Traction performance (index value) | 144 | 132 | 120 | 81 |
| Uneven wear resistance (index value) | 81 | 98 | 81 | 144 |

TABLE 5-1

|  | Comparative Example 29 | Comparative Example 30 | Comparative Example 31 | Comparative Example 32 | Comparative Example 33 |
|---|---|---|---|---|---|
| Directional tread pattern | Directional | Directional | Directional | Directional | Directional |
| Inclination angle α of lug main grooves (°) | 30 | 30 | 30 | 30 | 30 |
| Ratio W1/W2 | 1.0 | 1.0 | 1.0 | 1.0 | 1.0 |
| Shoulder inclined grooves opening | Yes | Yes | Yes | Yes | Yes |
| Inclination direction of shoulder inclined grooves | Opposite direction | Opposite direction | Opposite direction | Opposite direction | Opposite direction |
| Groove area ratio of tread portion | 0.8 | 0.6 | 0.6 | 0.6 | 0.6 |
| Ratio S/P | 0.5 | 0 | 0.2 | 0.5 | 0.5 |
| Inclination angle γ of center inclined grooves (°) | 30 | 30 | 30 | 5 | 45 |
| Ratio W3/W1 | 0.5 | 0.5 | 0.5 | 0.5 | 0.5 |
| Ratio X1/D2 | 1.0 | 1.0 | 1.0 | 1.0 | 1.0 |
| Ratio X2/D2 | 0.2 | 0.2 | 0.2 | 0.2 | 0.2 |
| Ratio X4/X3 | 0.5 | 0.5 | 0.5 | 0.5 | 0.5 |
| Ratio X5/D2 | 0.5 | 0.5 | 0.5 | 0.5 | 0.5 |
| Ratio D4/D2 | 0.5 | 0.5 | 0.5 | 0.5 | 0.5 |
| Ratio D3/D2 | 0.5 | 0.5 | 0.5 | 0.5 | 0.5 |
| Center position of shoulder inclined groove (X/TW) | 0.25 | 0.25 | 0.25 | 0.25 | 0.25 |
| Inclination angle β of shoulder inclined groove (°) | 90 | 90 | 90 | 90 | 90 |
| Ratio A1/A2 | 0.4 | 0.4 | 0.4 | 0.4 | 0.4 |
| Ratio D1/D2 | 0.5 | 0.5 | 0.5 | 0.5 | 0.5 |
| Ratio W4/W3 | — | — | — | — | — |
| Ratio D5/D2 | — | — | — | — | — |
| Traction performance (index value) | 150 | 132 | 122 | 90 | 90 |
| Uneven wear resistance (index value) | 90 | 91 | 97 | 127 | 98 |

TABLE 5-2

|  | Comparative Example 34 | Comparative Example 35 | Comparative Example 36 | Comparative Example 37 |
|---|---|---|---|---|
| Directional tread pattern | Directional | Directional | Directional | Directional |
| Inclination angle α of lug main grooves (°) | 30 | 30 | 30 | 30 |
| Ratio W1/W2 | 1.0 | 1.0 | 1.0 | 1.0 |
| Shoulder inclined grooves opening | Yes | Yes | Yes | Yes |
| Inclination direction of shoulder inclined grooves | Opposite direction | Opposite direction | Opposite direction | Opposite direction |
| Groove area ratio of tread portion | 0.6 | 0.6 | 0.6 | 0.6 |
| Ratio S/P | 0.5 | 0.5 | 0.5 | 0.5 |
| Inclination angle γ of center inclined grooves (°) | 30 | 30 | 30 | 30 |
| Ratio W3/W1 | 0.2 | 0.9 | 0.5 | 0.5 |
| Ratio X1/D2 | 1.0 | 1.0 | 0 | 0.2 |
| Ratio X2/D2 | 0.2 | 0.2 | — | 0.2 |
| Ratio X4/X3 | 0.5 | 0.5 | — | 0.5 |

TABLE 5-2-continued

|  | Comparative Example 34 | Comparative Example 35 | Comparative Example 36 | Comparative Example 37 |
|---|---|---|---|---|
| Ratio X5/D2 | 0.5 | 0.5 | — | 0.5 |
| Ratio D4/D2 | 0.5 | 0.5 | — | 0.5 |
| Ratio D3/D2 | 0.5 | 0.5 | 0.5 | 0.5 |
| Center position of shoulder inclined groove (X/TW) | 0.25 | 0.25 | 0.25 | 0.25 |
| Inclination angle β of shoulder inclined groove (°) | 90 | 90 | 90 | 90 |
| Ratio A1/A2 | 0.4 | 0.4 | 0.4 | 0.4 |
| Ratio D1/D2 | 0.5 | 0.5 | 0.5 | 0.5 |
| Ratio W4/W3 | — | — | — | — |
| Ratio D5/D2 | — | — | — | — |
| Traction performance (index value) | 96 | 132 | 132 | 128 |
| Uneven wear resistance (index value) | 127 | 92 | 89 | 98 |

TABLE 6-1

|  | Example 21 | Example 22 | Example 23 | Example 24 | Example 25 |
|---|---|---|---|---|---|
| Directional tread pattern | Directional | Directional | Directional | Directional | Directional |
| Inclination angle α of lug main grooves (°) | 30 | 30 | 30 | 30 | 30 |
| Ratio W1/W2 | 1.0 | 1.0 | 1.0 | 1.0 | 1.0 |
| Shoulder inclined grooves opening | Yes | Yes | Yes | Yes | Yes |
| Inclination direction of shoulder inclined grooves | Opposite direction | Opposite direction | Opposite direction | Opposite direction | Opposite direction |
| Groove area ratio of tread portion | 0.6 | 0.6 | 0.6 | 0.6 | 0.6 |
| Ratio S/P | 0.5 | 0.5 | 0.5 | 0.5 | 0.5 |
| Inclination angle γ of center inclined grooves (°) | 30 | 30 | 30 | 30 | 30 |
| Ratio W3/W1 | 0.5 | 0.5 | 0.5 | 0.5 | 0.5 |
| Ratio X1/D2 | 1.0 | 1.0 | 1.0 | 1.0 | 1.0 |
| Ratio X2/D2 | 0.2 | −0.2 | 1.2 | 0.2 | 0.2 |
| Ratio X4/X3 | 0.5 | 0.5 | 0.5 | −1.2 | −0.5 |
| Ratio X5/D2 | 0.5 | 0.5 | 0.5 | 0.5 | 0.5 |
| Ratio D4/D2 | 0.5 | 0.5 | 0.5 | 0.5 | 0.5 |
| Ratio D3/D2 | 0.5 | 0.5 | 0.5 | 0.5 | 0.5 |
| Center position of shoulder inclined groove (X/TW) | 0.25 | 0.25 | 0.25 | 0.25 | 0.25 |
| Inclination angle β of shoulder inclined groove (°) | 90 | 90 | 90 | 90 | 90 |
| Ratio A1/A2 | 0.4 | 0.4 | 0.4 | 0.4 | 0.4 |
| Ratio D1/D2 | 0.5 | 0.5 | 0.5 | 0.5 | 0.5 |
| Ratio W4/W3 | — | — | — | — | — |
| Ratio D5/D2 | — | — | — | — | — |
| Traction performance (index value) | 120 | 102 | 132 | 104 | 132 |
| Uneven wear resistance (index value) | 115 | 127 | 102 | 103 | 104 |

TABLE 6-2

|  | Example 26 | Example 27 | Example 28 | Example 29 | Example 30 |
|---|---|---|---|---|---|
| Directional tread pattern | Directional | Directional | Directional | Directional | Directional |
| Inclination angle α of lug main grooves (°) | 30 | 30 | 30 | 30 | 30 |
| Ratio W1/W2 | 1.0 | 1.0 | 1.0 | 1.0 | 1.0 |
| Shoulder inclined grooves opening | Yes | Yes | Yes | Yes | Yes |
| Inclination direction of shoulder inclined grooves | Opposite direction | Opposite direction | Opposite direction | Opposite direction | Opposite direction |

TABLE 6-2-continued

|  | Example 26 | Example 27 | Example 28 | Example 29 | Example 30 |
| --- | --- | --- | --- | --- | --- |
| Groove area ratio of tread portion | 0.6 | 0.6 | 0.6 | 0.6 | 0.6 |
| Ratio S/P | 0.5 | 0.5 | 0.5 | 0.5 | 0.5 |
| Inclination angle γ of center inclined grooves (°) | 30 | 30 | 30 | 30 | 30 |
| Ratio W3/W1 | 0.5 | 0.5 | 0.5 | 0.5 | 0.5 |
| Ratio X1/D2 | 1.0 | 1.0 | 1.0 | 1.0 | 1.0 |
| Ratio X2/D2 | 0.2 | 0.2 | 0.2 | 0.2 | 0.2 |
| Ratio X4/X3 | 0 | 1.2 | 0.5 | 0.5 | 0.5 |
| Ratio X5/D2 | 0.5 | 0.5 | −0.1 | 1.1 | 0.5 |
| Ratio D4/D2 | 0.5 | 0.5 | 0.5 | 0.5 | 0.2 |
| Ratio D3/D2 | 0.5 | 0.5 | 0.5 | 0.5 | 0.5 |
| Center position of shoulder inclined groove (X/TW) | 0.25 | 0.25 | 0.25 | 0.25 | 0.25 |
| Inclination angle β of shoulder inclined groove (°) | 90 | 90 | 90 | 90 | 90 |
| Ratio A1/A2 | 0.4 | 0.4 | 0.4 | 0.4 | 0.4 |
| Ratio D1/D2 | 0.5 | 0.5 | 0.5 | 0.5 | 0.5 |
| Ratio W4/W3 | — | — | — | — | — |
| Ratio D5/D2 | — | — | — | — | — |
| Traction performance (index value) | 126 | 101 | 102 | 132 | 126 |
| Uneven wear resistance (index value) | 107 | 127 | 121 | 102 | 102 |

TABLE 7-1

|  | Example 31 | Example 32 | Example 33 | Example 34 | Example 35 |
| --- | --- | --- | --- | --- | --- |
| Directional tread pattern | Directional | Directional | Directional | Directional | Directional |
| Inclination angle α of lug main grooves (°) | 30 | 30 | 30 | 30 | 30 |
| Ratio W1/W2 | 1.0 | 1.0 | 1.0 | 1.0 | 1.0 |
| Shoulder inclined grooves opening | Yes | Yes | Yes | Yes | Yes |
| Inclination direction of shoulder inclined grooves | Opposite direction | Opposite direction | Opposite direction | Opposite direction | Opposite direction |
| Groove area ratio of tread portion | 0.6 | 0.6 | 0.6 | 0.6 | 0.6 |
| Ratio S/P | 0.5 | 0.5 | 0.5 | 0.5 | 0.5 |
| Inclination angle γ of center inclined grooves (°) | 30 | 30 | 30 | 30 | 30 |
| Ratio W3/W1 | 0.5 | 0.5 | 0.5 | 0.5 | 0.5 |
| Ratio X1/D2 | 1.0 | 1.0 | 1.0 | 1.0 | 1.0 |
| Ratio X2/D2 | 0.2 | 0.2 | 0.2 | 0.2 | 0.2 |
| Ratio X4/X3 | 0.5 | 0.5 | 0.5 | 0.5 | 0.5 |
| Ratio X5/D2 | 0.5 | 0.5 | 0.5 | 0.5 | 0.5 |
| Ratio D4/D2 | 0.8 | 0.5 | 0.5 | 0.5 | 0.5 |
| Ratio D3/D2 | 0.5 | 0.2 | 0.8 | 0.5 | 0.5 |
| Center position of shoulder inclined groove (X/TW) | 0.25 | 0.25 | 0.25 | 0.25 | 0.25 |
| Inclination angle β of shoulder inclined groove (°) | 90 | 90 | 90 | 90 | 90 |
| Ratio A1/A2 | 0.4 | 0.4 | 0.4 | 0.4 | 0.4 |
| Ratio D1/D2 | 0.5 | 0.5 | 0.5 | 0.2 | 0.8 |
| Ratio W4/W3 | — | — | — | — | — |
| Ratio D5/D2 | — | — | — | — | — |
| Traction performance (index value) | 102 | 102 | 138 | 102 | 138 |
| Uneven wear resistance (index value) | 120 | 127 | 104 | 127 | 104 |

TABLE 7-2

|  | Example 36 | Example 37 | Example 38 | Example 39 |
|---|---|---|---|---|
| Directional tread pattern | Directional | Directional | Directional | Directional |
| Inclination angle α of lug main grooves (°) | 30 | 30 | 30 | 30 |
| Ratio W1/W2 | 1.0 | 1.0 | 1.0 | 1.0 |
| Shoulder inclined grooves opening | Yes | Yes | Yes | Yes |
| Inclination direction of shoulder inclined grooves | Opposite direction | Opposite direction | Opposite direction | Opposite direction |
| Groove area ratio of tread portion | 0.6 | 0.6 | 0.6 | 0.6 |
| Ratio S/P | 0.5 | 0.5 | 0.5 | 0.5 |
| Inclination angle γ of center inclined grooves (°) | 30 | 30 | 30 | 30 |
| Ratio W3/W1 | 0.5 | 0.5 | 0.5 | 0.5 |
| Ratio X1/D2 | 1.0 | 1.0 | 1.0 | 1.0 |
| Ratio X2/D2 | 0.2 | 0.2 | 0.2 | 0.2 |
| Ratio X4/X3 | 0.5 | 0.5 | 0.5 | 0.5 |
| Ratio X5/D2 | 0.5 | 0.5 | 0.5 | 0.5 |
| Ratio D4/D2 | 0.5 | 0.5 | 0.5 | 0.5 |
| Ratio D3/D2 | 0.5 | 0.5 | 0.5 | 0.5 |
| Center position of shoulder inclined groove (X/TW) | 0.25 | 0.25 | 0.25 | 0.25 |
| Inclination angle β of shoulder inclined groove (°) | 90 | 90 | 90 | 90 |
| Ratio A1/A2 | 0.4 | 0.4 | 0.4 | 0.4 |
| Ratio D1/D2 | 0.5 | 0.5 | 0.5 | 0.5 |
| Ratio W4/W3 | 0.2 | 0.6 | 0.2 | 0.2 |
| Ratio D5/D2 | 0.8 | 0.8 | 0.05 | 0.8 |
| Traction performance (index value) | 126 | 138 | 127 | 126 |
| Uneven wear resistance (index value) | 127 | 106 | 127 | 114 |

As is clear from Tables 4 to 7, as compared with Conventional Example 21, with each of the tires of Examples 21 to 39, traction performance and uneven wear resistance were superior. In contrast, with the tires of Comparative Examples 21 to 24, 28, 32, and 34, although there was no problem with uneven wear resistance, traction performance was reduced. In addition, although the tires of Comparative Examples 25 to 27, 29 to 31, and 35 to 37 did not have a problem with traction performance, uneven wear resistance was reduced. The tire of Comparative Example 33 had reduced traction performance and uneven wear resistance.

The invention claimed is:

1. A pneumatic tire, comprising:
   an annular tread portion extending in a tire circumferential direction;
   a pair of sidewall portions disposed on either side of the tread portion; and
   a pair of bead portions disposed inward of the sidewall portions in a tire radial direction;
   lug main grooves extending in a tire lateral direction and opening to a tread edge being formed on either side of a tire equator in the tread portion, the lug main grooves being inclined with respect to the tire lateral direction in a symmetrical manner about the tire equator, an inclination angle α of the lug main grooves with respect to the tire lateral direction at a position 25% of a tread width from the tire equator being set to a range $15° \leq \alpha \leq 45°$, and a width W1 of the lug main grooves at the tread edge and an interval W2 between the lug main grooves at the tread edge satisfying a relationship $0.7 \leq W1/W2 \leq 1.5$;
   shoulder inclined grooves connecting lug main grooves adjacent in the tire circumferential direction being formed in land portions of the tread portion defined by the lug main grooves, each of the land portions defined by the lug main grooves being divided only by a single shoulder inclined groove of the shoulder inclined grooves, the shoulder inclined grooves each being inclined in an opposite direction with respect to the tire circumferential direction to a corresponding lug main groove of the lug main grooves, an inclination angle β of the shoulder inclined grooves with respect to the lug main grooves being set in a range $80° \leq \beta \leq 100°$, a center position of the shoulder inclined grooves being set in a range from 15% to 35% of the tread width from the tire equator, and an area A1 of the shoulder inclined grooves and an area A2 of shoulder blocks defined outside the shoulder inclined grooves satisfying a relationship $0.2 \leq A1/A2 \leq 0.6$; and
   a groove area ratio of the tread portion being from 0.4 to 0.7.

2. The pneumatic tire according to claim 1, wherein
   positions of the lug main grooves are offset in the tire circumferential direction on either side of the tire equator; and
   an offset amount S of the lug main grooves and a pitch P of the lug main grooves in the tire circumferential direction satisfy a relationship $0.3 \leq S/P \leq 0.5$.

3. The pneumatic tire according to claim 2, wherein
   a groove depth D1 of the shoulder inclined grooves at a central position in a longitudinal direction and a groove depth D2 of the lug main grooves at a position 25% of the tread width from the tire equator satisfy a relationship $0.3 \leq D1/D2 \leq 0.7$.

4. The pneumatic tire according to claim 3, wherein
   center inclined grooves connecting the lug main grooves located on either side of the tire equator are formed in the tread portion; and
   a width W3 of the center inclined grooves at a central position in a longitudinal direction and the width W1 of the lug main grooves at the tread edge satisfy a relationship $0.3 \leq W3/W1 \leq 0.8$.

5. The pneumatic tire according to claim 4, wherein
   a groove depth D3 of the center inclined grooves at a central position in a longitudinal direction and a groove depth D2 of the lug main grooves at a position 25% of the tread width from the tire equator satisfy a relationship $0.3 \leq D3/D2 \leq 0.7$.

6. The pneumatic tire according to claim 5, wherein
   each of the lug main grooves communicate with another two of the lug main grooves via two of the center inclined grooves;
   an inclination angle γ of the center inclined grooves with respect to the tire lateral direction is set to a range $10° \leq \gamma \leq 40°$;
   center blocks located further inward in the tire lateral direction than the shoulder inclined grooves are defined in the tread portion;
   each of the center blocks comprises a chamfered portion at a corner portion sandwiched by two of the center inclined grooves; and
   a distance X1 in the tire lateral direction from a ridge line on a road contact surface of the chamfered portion to an end of the corner portion and a groove depth $D2$ of the lug main grooves at a position 25% of the tread width from the tire equator satisfy a relationship $0.3 \leq X1/D2$.

7. The pneumatic tire according to claim 6, wherein
at least a portion of the ridge line on the road contact surface of the chamfered portion is located on a side of the tire equator where the end of the corner portion is located; and
a maximum separation amount $X2$ of the ridge line from the tire equator and the groove depth $D2$ of the lug main grooves at a position 25% of the tread width from the tire equator satisfy a relationship $0 < X2/D2 \leq 1.0$.

8. The pneumatic tire according to claim 6, wherein
both end points of the ridge line on the road contact surface of the chamfered portion are located on the side of the tire equator where the end of the corner portion is located; and
a separation amount $X3$ from the tire equator at one of the end points and a separation amount $X4$ from the tire equator at the other end point satisfy the relationship $0 \leq X4/X3 \leq 1.0$.

9. The pneumatic tire according to claim 6, wherein
the ridge line on the road contact surface of the chamfered portion is a curve, projecting toward the end of the corner portion; and
a protruding amount $X5$ of the curve and the groove depth $D2$ of the lug main grooves at a position 25% of the tread width from the tire equator satisfy a relationship $0.05 \leq X5/D2 \leq 1.0$.

10. The pneumatic tire according to claim 1, wherein
a groove depth $D1$ of the shoulder inclined grooves at a central position in a longitudinal direction and a groove depth $D2$ of the lug main grooves at a position 25% of the tread width from the tire equator satisfy a relationship $0.3 \leq D1/D2 \leq 0.7$.

11. The pneumatic tire according to claim 1, wherein
center inclined grooves connecting the lug main grooves located on either side of the tire equator are formed in the tread portion; and
a width $W3$ of the center inclined grooves at a central position in a longitudinal direction and the width $W1$ of the lug main grooves at the tread edge satisfy a relationship $0.3 \leq W3/W1 \leq 0.8$.

12. The pneumatic tire according to claim 11, wherein
a groove depth $D3$ of the center inclined grooves at a central position in a longitudinal direction and a groove depth $D2$ of the lug main grooves at a position 25% of the tread width from the tire equator satisfy a relationship $0.3 \leq D3/D2 \leq 0.7$.

13. The pneumatic tire according to claim 11, wherein
each of the lug main grooves communicate with another two of the lug main grooves via two of the center inclined grooves;
an inclination angle $\gamma$ of the center inclined grooves with respect to the tire lateral direction is set to a range $10° \leq \gamma \leq 40°$;
center blocks located further inward in the tire lateral direction than the shoulder inclined grooves are defined in the tread portion;
each of the center blocks comprises a chamfered portion at a corner portion sandwiched by two of the center inclined grooves; and a distance $X1$ in the tire lateral direction from a ridge line on a road contact surface of the chamfered portion to an end of the corner portion and a groove depth $D2$ of the lug main grooves at a position 25% of the tread width from the tire equator satisfy a relationship $0.3 \leq X1/D2$.

14. The pneumatic tire according to claim 13, wherein
at least a portion of the ridge line on the road contact surface of the chamfered portion is located on a side of the tire equator where the end of the corner portion is located; and
a maximum separation amount $X2$ of the ridge line from the tire equator and the groove depth $D2$ of the lug main grooves at a position 25% of the tread width from the tire equator satisfy a relationship $0 < X2/D2 \leq 1.0$.

15. The pneumatic tire according to claim 13, wherein
both end points of the ridge line on the road contact surface of the chamfered portion are located on the side of the tire equator where the end of the corner portion is located; and
a separation amount $X3$ from the tire equator at one of the end points and a separation amount $X4$ from the tire equator at the other end point satisfy the relationship $0 \leq X4/X3 \leq 1.0$.

16. The pneumatic tire according to claim 13, wherein
only one end point of two end points of the ridge line on the road contact surface of the chamfered portion is located on the side of the tire equator where the end of the corner portion is located; and
a separation amount $X3$ from the tire equator at one of the end points and a separation amount $X4$ from the tire equator at the other end point satisfy the relationship $-1.0 \leq X4/X3 \leq 0$.

17. The pneumatic tire according to claim 13, wherein
the ridge line on the road contact surface of the chamfered portion is a curve, projecting toward the end of the corner portion; and
a protruding amount $X5$ of the curve and the groove depth $D2$ of the lug main grooves at a position 25% of the tread width from the tire equator satisfy a relationship $0.05 \leq X5/D2 \leq 1.0$.

18. The pneumatic tire according to claim 13, wherein
a groove depth $D4$ of the chamfered portion and the groove depth $D2$ of the lug main grooves at a position 25% of the tread width from the tire equator satisfy a relationship $0.3 \leq D4/D2 \leq 0.7$.

19. The pneumatic tire according to claim 11, wherein
a narrow groove that opens at both ends to the lug main grooves is formed at a bottom portion of each of the center inclined grooves; and
a width $W4$ of the narrow groove and the width $W3$ of the center inclined grooves at the central position in the longitudinal direction satisfy a relationship $0.05 \leq W4/W3 \leq 0.5$.

20. The pneumatic tire according to claim 19, wherein
a groove depth $D5$ of the narrow groove with the road contact surface of the tread portion as a reference and the groove depth $D2$ of the lug main grooves at a position 25% of the tread width from the tire equator satisfy a relationship $0.5 \leq D5/D2 \leq 1.0$.

* * * * *